(12) United States Patent
Omata et al.

(10) Patent No.: US 11,594,942 B2
(45) Date of Patent: Feb. 28, 2023

(54) CONTROL APPARATUS FOR ROTATING ELECTRIC MACHINE

(71) Applicant: DENSO CORPORATION, Kariya (JP)

(72) Inventors: Ryuji Omata, Kariya (JP); Hirofumi Kako, Kariya (JP); Kiyotaka Matsubara, Toyota (JP); Kazuhito Hayashi, Toyota (JP); Makoto Nakamura, Toyota (JP)

(73) Assignee: DENSO CORPORATION, Kariya (JP)

( * ) Notice: Subject to any disclaimer, the term of this patent is extended or adjusted under 35 U.S.C. 154(b) by 302 days.

(21) Appl. No.: 16/802,908

(22) Filed: Feb. 27, 2020

(65) Prior Publication Data

US 2020/0195100 A1 Jun. 18, 2020

Related U.S. Application Data

(63) Continuation of application No. PCT/JP2018/031474, filed on Aug. 27, 2018.

(30) Foreign Application Priority Data

Aug. 31, 2017 (JP) .............................. JP2017-166764

(51) Int. Cl.
*H02K 11/33* (2016.01)
*H02K 15/04* (2006.01)
*H02P 27/06* (2006.01)

(52) U.S. Cl.
CPC ......... *H02K 11/33* (2016.01); *H02K 15/0435* (2013.01); *H02P 27/06* (2013.01)

(58) Field of Classification Search
CPC .... H02K 11/33; H02K 15/0435; H02P 27/06; H02P 27/08; H02M 7/48

(Continued)

(56) References Cited

U.S. PATENT DOCUMENTS 7,956,563 B2 * 6/2011 Perisic .................... B60L 58/40
318/400.41
7,956,569 B2 * 6/2011 Welchko ................. B60L 58/20
318/105

(Continued)

FOREIGN PATENT DOCUMENTS

JP 2003-134834 A 5/2003
JP 2010-130793 A 6/2010

(Continued)

OTHER PUBLICATIONS

English translation of Yoshida et al. (JP 2010130793 A), patent file date Mar. 7, 2010.*

(Continued)

*Primary Examiner* — John K Kim
(74) *Attorney, Agent, or Firm* — Oliff PLC

(57) ABSTRACT

A control apparatus is provided for controlling drive of a rotating electric machine that has coils of two or more phases. The control apparatus includes a first inverter to be connected with first ends of the coils, a second inverter to be connected with second ends of the coils, and a controller. The first inverter has a plurality of first switching elements each corresponding to one of the coils. The second inverter has a plurality of second switching elements each corresponding to one of the coils. The controller includes a first operation circuit configured to generate a first control signal for control of the first inverter and a second operation circuit configured to generate a second control signal for control of the second inverter. Moreover, the control apparatus is configured so that switching timings are synchronized, based on synchronization information, between the first and second inverters.

7 Claims, 34 Drawing Sheets

(58) Field of Classification Search
USPC .......................................................... 310/10
See application file for complete search history.

(56) References Cited

U.S. PATENT DOCUMENTS

| | | | | |
|---|---|---|---|---|
| 8,026,691 | B2* | 9/2011 | Nagashima | B60L 58/40 |
| | | | | 318/400.26 |
| 8,054,032 | B2* | 11/2011 | Chakrabarti | B60L 58/20 |
| | | | | 363/133 |
| 8,102,142 | B2* | 1/2012 | Smith | H02J 1/102 |
| | | | | 318/400.26 |
| 8,122,985 | B2* | 2/2012 | Nagashima | B60L 58/30 |
| | | | | 180/65.285 |
| 10,784,806 | B2* | 9/2020 | Omata | H02P 27/06 |
| 10,790,774 | B2* | 9/2020 | Takahashi | H02M 7/53875 |
| 11,018,614 | B2* | 5/2021 | Omata | H02P 27/08 |
| 11,114,959 | B2* | 9/2021 | Oka | B60L 58/18 |
| 11,218,106 | B2* | 1/2022 | Oka | H02P 21/18 |
| 11,394,210 | B2* | 7/2022 | Shimizu | B60L 53/24 |
| 2006/0164028 | A1 | 7/2006 | Welchko et al. | |
| 2014/0203756 | A1 | 7/2014 | Kajiura et al. | |
| 2015/0188475 | A1 | 7/2015 | Lee | |
| 2015/0288257 | A1* | 10/2015 | Cooper | H02P 21/14 |
| | | | | 318/460 |
| 2019/0386599 | A1* | 12/2019 | Takahashi | H02P 7/291 |
| 2020/0195100 | A1* | 6/2020 | Omata | H02K 15/0435 |

FOREIGN PATENT DOCUMENTS

| | | |
|---|---|---|
| JP | 2015-139340 A | 7/2015 |
| JP | 2015-198458 A | 11/2015 |
| JP | 2016-131426 A | 7/2016 |
| JP | 2016-181949 A | 10/2016 |

OTHER PUBLICATIONS

Nov. 27, 2018 Search Report issued in International Patent Application No. PCT/JP2018/031474.

* cited by examiner

CONTROL APPARATUS FOR ROTATING ELECTRIC MACHINE

CROSS-REFERENCE TO RELATED APPLICATIONS

The present application is a continuation application of International Application No. PCT/JP2018/031474 filed on Aug. 27, 2018, which is based on and claims priority from Japanese Patent Application No. 2017-166764 filed on Aug. 31, 2017. The contents of these applications are hereby incorporated by reference in their entirety into the present application.

BACKGROUND

1 Technical Field

The present disclosure relates to control apparatuses for rotating electric machines.

2 Description of Related Art

There are known double-ended inverter drive systems which include two voltage sources and two inverters. The two voltage sources are used in series with each other by switching control of the two inverters.

SUMMARY

According to the present disclosure, there is provided a control apparatus for controlling drive of a rotating electric machine. The rotating electric machine has coils of two or more phases. The control apparatus includes a first inverter to be connected with first ends of the coils, a second inverter to be connected with second ends of the coils, and a controller. The first inverter has a plurality of first switching elements each corresponding to one of the coils. The second inverter has a plurality of second switching elements each corresponding to one of the coils. The controller includes a first operation circuit and a second operation circuit. The first operation circuit is configured to generate a first control signal for control of the first inverter. The second operation circuit is configured to generate a second control signal for control of the second inverter. Moreover, the control apparatus is configured so that switching timings are synchronized, based on synchronization information, between the first and second inverters.

DESCRIPTION OF EMBODIMENTS

Figure 1:
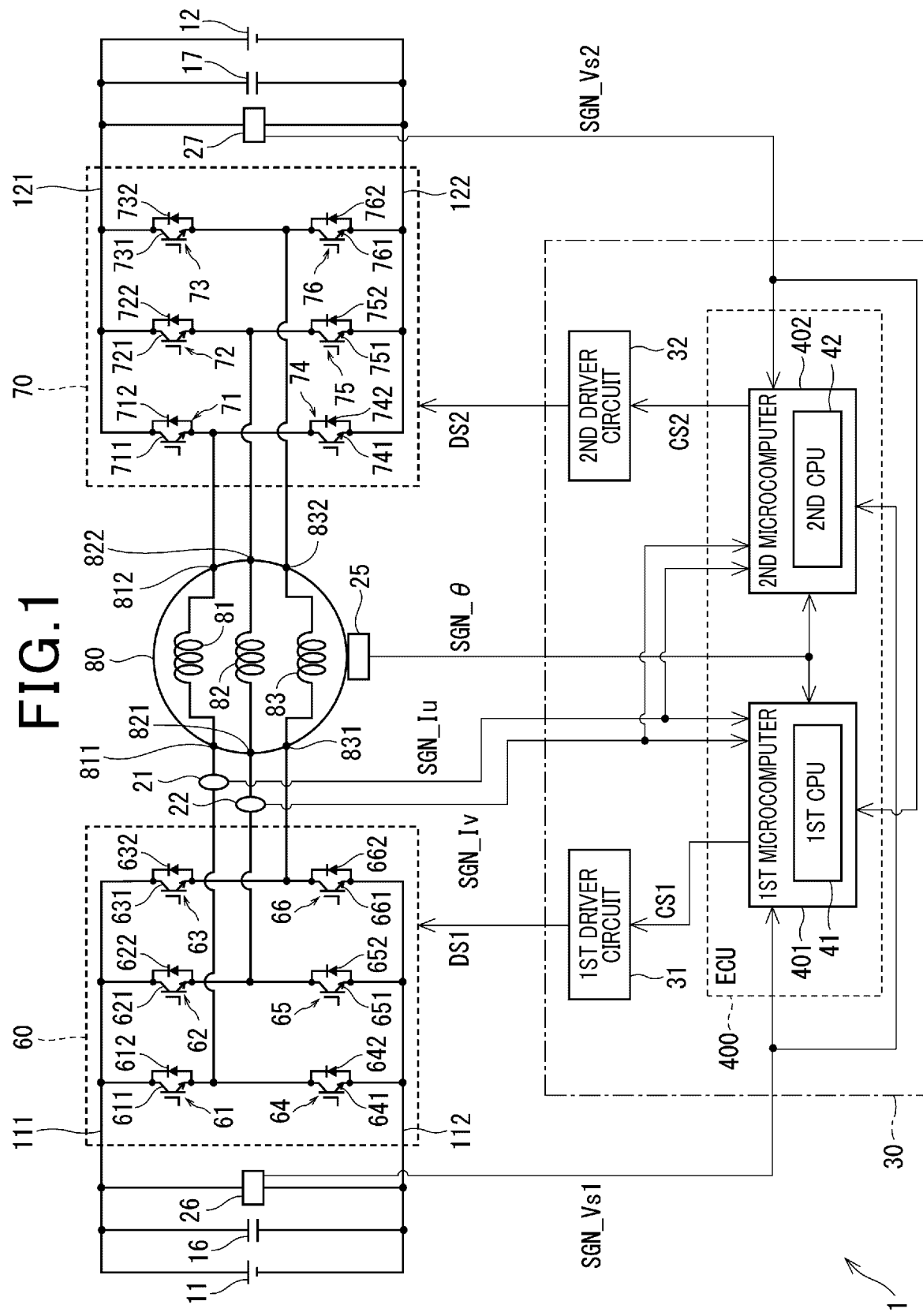
FIG. 1 is a schematic diagram illustrating the configuration of a control apparatus for a rotating electric machine according to a first embodiment.

In Japanese Patent Application Publication No. JP 2006-238686 A, there are described operating principles of a double-ended inverter drive system in an ideal state; the double-ended inverter drive system includes two voltage sources and two inverters. However, in the case of each of the two inverters having one operation circuit (or arithmetic and logic unit) provided therein, if information recognition and control timings in one of the two inverters are asynchronous with those in the other inverter, deviation of switching timings may occur between the two inverters. Consequently, upon occurrence of deviation of switching timings between the two inverters, unexpected zero voltage vectors may be generated, thereby causing the motor output to be lowered and the motor behavior to become unstable.

In contrast, the above-described control apparatus according to the present disclosure is configured so that switching timings are synchronized, based on synchronization information, between the first and second inverters. Consequently, it becomes possible for the control apparatus to suitably control drive of the rotating electric machine without causing problems, such as decrease in the output of the rotating electric machine, to occur due to deviation of the switching timings. As a result, it becomes possible to drive the rotating electric machine in an intended manner.

Exemplary embodiments will be described hereinafter with reference to the drawings. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the configuration of a control apparatus 1 for a rotating electric machine according to the first embodiment.

In the present embodiment, the control apparatus 1 is designed to be used for controlling drive of a motor-generator 80 which is a rotating electric machine. Hereinafter, the motor-generator 80 will be briefly referred to as "MG 80" whenever appropriate.

The MG 80 is installed in a vehicle (not shown) such as an electric vehicle or a hybrid vehicle. The MG 80 is of, for example, a permanent magnet synchronous three-phase AC type. The MG 80 includes a U-phase coil 81, a V-phase coil 82 and a W-phase coil 83. In addition, in the present embodiment, the coils 81-83 correspond to "coils of at two or more phases".

The MG 80 can function as an electric motor to drive driving wheels (not shown) of the vehicle. That is, the MG 80 can function as a main motor of the vehicle to generate torque for driving the driving wheels of the vehicle. Otherwise, the MG 80 can function as an electric generator to generate electric power upon being driven by kinetic energy transmitted from an engine (not shown) of the vehicle or from the driving wheels of the vehicle.

The MG 80 is supplied with electric power by both a first battery 11 (i.e., first voltage source) and a second battery 12 (i.e., second voltage source). The first and second batteries 11 and 12 are insulated from each other. In the present embodiment, each of the first and second batteries 11 and 12 is implemented by a secondary battery (or rechargeable battery) such as a nickel-metal hydride battery or a lithium-ion battery.

It should be noted that as the voltage sources, electric double-layer capacitors may be employed instead of the first and second batteries 11 and 12.

A first inverter 60 is connected between the MG 80 and the first battery 11 so that the MG 80 can receive/output electric power from/to the first battery 11 via the first inverter 60. Similarly, a second inverter 70 is connected between the MG 80 and the second battery 12 so that the MG 80 can receive/output electric power from/to the second battery 12 via the second inverter 70. That is, electric power can be supplied to the MG 80 from the first battery 11 via the first inverter 60 and from the second battery 12 via the second inverter 70.

A first capacitor 16 is connected between a high-potential-side wiring 111 and a low-potential-side wiring 112. The first capacitor 16 is a smoothing capacitor for smoothing a first input voltage Vs1 that is inputted to the first inverter 60. Similarly, a second capacitor 17 is connected between a high-potential-side wiring 121 and a low-potential-side wiring 122. The second capacitor 17 is a smoothing capacitor for smoothing a second input voltage Vs2 that is inputted to the second inverter 70.

The control apparatus 1 includes the first inverter 60, the second inverter 70 and a drive controller 30. The first inverter 60 is a three-phase inverter for switching the energization of the coils 81-83. The first inverter 60 includes first switching elements 61-66. The second inverter 70 is also a three-phase inverter for switching the energization of the coils 81-83. The second inverter 70 includes second switching elements 71-76.

The switching element 61 includes a switch section 611 and a flyback diode 612. Similarly, each of the switching elements 62-66 includes a switch section 621, 631, 641, 651 or 661 and a flyback diode 622, 632, 642, 652 or 662. Moreover, each of the switching elements 71-76 includes a switch section 711, 721, 731, 741, 751 or 761 and a flyback diode 712, 722, 732, 742, 752 or 762. Since all the switching elements 61-66 and 71-76 are identically configured to each other, only the configuration of the switching element 61 will be described below as an example.

In the switching element 61, the switch section 611 is constituted of an IGBT (Insulated Gate Bipolar Transistor). The on/off operation of the switch section 611 is controlled by the drive controller 30. It should be noted that the switch section 611 may alternatively be constituted of, for example, a MOSFET (Metal-Oxide-Semiconductor Field-Effect Transistor).

Moreover, in the switching element 61, the flyback diode 612 is connected in parallel with the switch section 611 to allow flow of electric current from the low-potential side to the high-potential side. The flyback diode 612 may be implemented by a built-in diode, such as a parasitic diode of a MOSFET, or by an external diode. It should be noted that instead of the flyback diode 612, a switch (e.g., an IGBT or a MOSFET) may be employed to allow flow of electric current from the low-potential side to the high-potential side.

In the first inverter 60, the switching elements 61-63 are connected with the high-potential-side wiring 111 whereas the switching elements 64-66 are connected with the low-potential-side wiring 112. Moreover, the high-potential-side wiring 111 is connected with a positive terminal of the first battery 11 whereas the low-potential-side wiring 112 is connected with a negative terminal of the first battery 11.

To a junction point (or node) between the U-phase switching elements 61 and 64, there is connected a first end 811 of the U-phase coil 81. To a junction point between the V-phase switching elements 62 and 65, there is connected a first end 821 of the V-phase coil 82. To a junction point between the W-phase switching elements 63 and 66, there is connected a first end 831 of the W-phase coil 83.

In the second inverter 70, the switching elements 71-73 are connected with the high-potential-side wiring 121 whereas the switching elements 74-76 are connected with the low-potential-side wiring 122. Moreover, the high-potential-side wiring 121 is connected with a positive terminal of the second battery 12 whereas the low-potential-side wiring 122 is connected with a negative terminal of the second battery 12. Hereinafter, whenever appropriate, the switching elements 61-63 and 71-73, which are connected to the high-potential side, will be referred to as upper-arm switching elements whereas the switching elements 64-66 and 74-76, which are connected to the low-potential side, will be referred to as lower-arm switching elements.

To a junction point between the U-phase switching elements 71 and 74, there is connected a second end 812 of the U-phase coil 81. To a junction point between the V-phase switching elements 72 and 75, there is connected a second end 822 of the V-phase coil 82. To a junction point between the W-phase switching elements 73 and 76, there is connected a second end 832 of the W-phase coil 83.

As above, in the present embodiment, the first and second inverters 60 and 70 are connected respectively to opposite sides of the coils 81-83 of the MG 80, forming a "double-voltage source and double-inverter" drive system for the MG 80.

A current sensor 21 is provided, between the first end 811 of the U-phase coil 81 and the junction point between the U-phase switching elements 61 and 64, to detect the U-phase current Iu supplied to the U-phase coil 81. Similarly, a current sensor 22 is provided, between the first end 821 of the V-phase coil 82 and the junction point between the V-phase switching elements 62 and 65, to detect the V-phase current Iv supplied to the V-phase coil 82. Each of the current sensors 21 and 22 may alternatively be provided at any other location where it can detect the phase current flowing in one of the coils 81-83. Moreover, the current sensors 21 and 22 may alternatively be provided to respectively detect the U-phase and W-phase currents or the V-phase and W-phase currents. Furthermore, there may be provided three current sensors to respectively detect the U-phase, V-phase and W-phase currents. In addition, the current sensors may alternatively be provided on the second inverter 70 side.

A rotation angle sensor 25 is provided to detect the electrical angle θ of the MG 80. In the present embodiment, the rotation angle sensor 25 is implemented by a resolver. However, it should be noted that the rotation angle sensor 25 may alternatively be implemented by, for example, a rotary encoder.

A first input voltage sensor 26 is provided to detect the first input voltage Vs1 that is inputted to the first inverter 60. A second input voltage sensor 27 is provided to detect the second input voltage Vs2 that is inputted to the second inverter 70.

A phase current signal SGN_Iu from the current sensor 21, a phase current signal SGN_Iv from the current sensor 22, a rotation angle signal SGN_θ from the rotation angle sensor 25, an input voltage signal SGN_Vs1 from the first input voltage sensor 26 and an input voltage signal SGN_Vs2 from the second input voltage sensor 27 are outputted to first and second microcomputers 401 and 402.

The drive controller 30 includes a first driver circuit 31, a second driver circuit 32 and an ECU (Electronic Control Unit) 400.

The first driver circuit 31 is configured to generate, according to a first control signal Cs1 from the ECU 400, first drive signals DS1 for controlling the on/off operation of the switching elements 61-66 and output the generated first drive signals DS1 to the first inverter 60. The first drive signals DS1 are gate voltages outputted to the gates of the switching elements 61-66.

Similarly, the second driver circuit 32 is configured to generate, according to a second control signal CS2 from the ECU 400, second drive signals DS2 for controlling the on/off operation of the switching elements 71-76 and output the generated second control signals CS2 to the second inverter 70. The second drive signals DS2 are gate voltages outputted to the gates of the switching elements 71-76.

The ECU 400 is configured mainly with the first and second microcomputers 401 and 402. Each of the first and second microcomputers 401 and 402 includes a CPU, a ROM, I/O devices and bus lines connecting the aforementioned components.

Each process in the ECU 400 may be a software process realized through the execution, by the CPU(s), of a program stored in advance in a substantive memory device (i.e., readable, non-temporary and tangible recording medium) such as the ROM(s), or a hardware process realized through an electronic circuit such as an FPGA (Field-Programmable Gate Array).

In the present embodiment, the ECU 400 includes the first microcomputer 401 having a first CPU 41 provided therein and the second microcomputer 402 having a second CPU 42 provided therein. That is, the ECU 400 includes a plurality of microcomputers each having at least one CPU provided therein. With both the first and second microcomputers 401 and 402 provided in the ECU 400, it becomes possible to build a redundant system which can continue drive of the MG 80 even when either of the microcomputers 401 and 402 malfunctions. Moreover, it also becomes possible improve the reliability of the ECU 400 through mutual monitoring of the first and second microcomputers 401 and 402.

Figure 2:
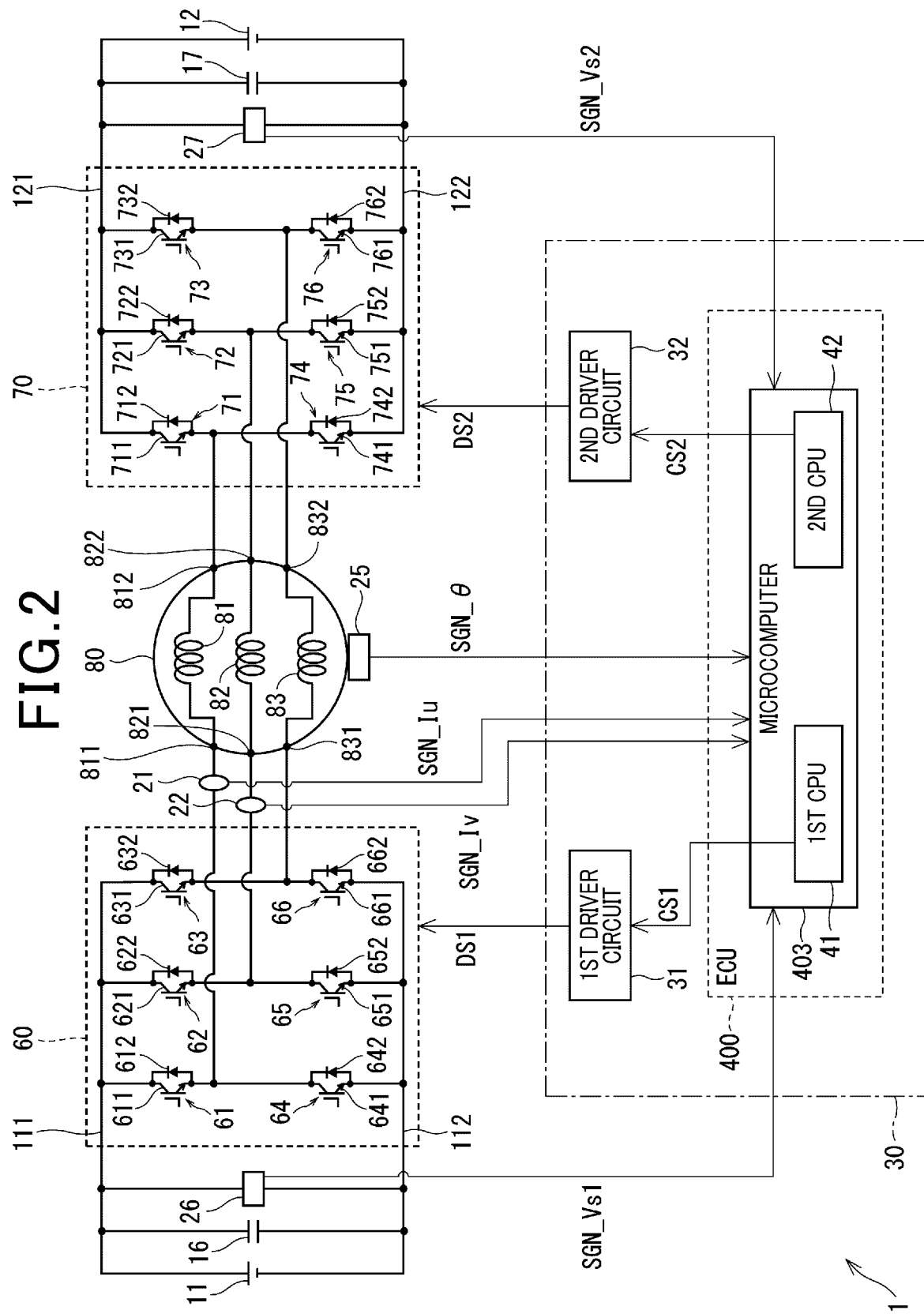
FIG. 2 is a schematic diagram illustrating the configuration of a control apparatus according to a modification of the first embodiment.

Alternatively, as shown in FIG. 2, the ECU 400 may include only a single microcomputer 403 that has both first and second CPUs 41 and 42 provided therein. In this case, with the use of the single multi-core microcomputer 403, it becomes possible to improve the design flexibility and reduce the size of the ECU 400. In addition, in the subsequent embodiments to be described later, the ECU 400 may also be modified to include only a single microcomputer 403 that has both first and second CPUs 41 and 42 provided therein.

In the present embodiment, the first CPU 41 generates the first control signal CS1 for drive control of the first inverter 60 and the second CPU 42 generates the second control signal CS2 for drive control of the second inverter 70. The first microcomputer 401 corresponds to a "first controller" and the second microcomputer 402 corresponds to a "second controller". Moreover, the first CPU 41 corresponds to a "first operation circuit (or arithmetic and logic unit)" and the second CPU 42 corresponds to a "second operation circuit (or arithmetic and logic unit)".

In addition, in some of the figures, the first CPU 41 is designated by "CPU1"; the second CPU 42 is designated by "CPU2"; the first driver circuit 31 is designated by "DRV1"; and the second driver circuit 32 is designated by "DRV2".

The motor drive system according to the present embodiment includes the batteries 11 and 12 which are two insulated voltage sources, and the open-coil MG 80 having two independent inverters 60 and 70 connected respectively to opposite sides thereof. Moreover, the two batteries 11 and 12 can be serialized through switching control of the two inverters 60 and 70, thereby increasing the output of the MG 80.

With the double-voltage source and double-inverter configuration, in the case of the batteries 11 and 12 being used in series with each other, for each of the U, V and W phases, the switching elements of the phase which are respectively included in the first and second inverters 60 and 70 and have an inverse upper-arm and lower-arm relationship with each other are turned on and off at the same time. Here, the expression "the switching elements have an inverse upper-arm and lower-arm relationship with each other" denotes that one of the switching elements is an upper-arm switching element while the other of the switching elements is a lower-arm switching element. Moreover, the control of simultaneously turning on and off, for each of the U, V and W phases, the switching elements of the phase which are respectively included in the first and second inverters 60 and 70 and have an inverse upper-arm and lower-arm relationship with each other will be referred to as "inverse SW control" hereinafter whenever appropriate.

It should be noted that the switching control of the inverters 60 and 70 is not limited to the inverse SW control, but may alternatively be carried out in any other suitable manner.

In the present embodiment, the first control signal CS1 for control of the first inverter 60 is generated by the first CPU 41 and the second control signal CS2 for control of the second inverter 70 is generated by the second CPU 42. Therefore, if information recognition and control timings in one of the CPUs 41 and 42 are asynchronous with those in the other of the CPUs 41 and 42, deviation of switching timings may occur between the inverters 60 and 70. Consequently, with the switching timings in one of the inverters 60 and 70 being asynchronous with those in the other of the inverters 60 and 70, unexpected zero voltage vectors may be generated, thereby causing the output of the MG 80 to be lowered and the behavior of the MG 80 to become unstable. As a result, it may become impossible to drive the MG 80 in an intended manner.

In view of the above, in the present embodiment, a synchronization process is performed to synchronize timings between the first CPU 41 and the second CPU 42. It should be noted that the concept of synchronization of timings between the CPUs 41 and 42 encompasses the case of first synchronizing timings between the CPUs 41 and 42 and then intentionally offsetting the timings from each other by a predetermined amount. Moreover, the synchronization process includes: performing control on the basis of common information such as common angle information; synchronizing control timings between the CPUs 41 and 42 by synchronizing clock signals and/or carrier signals therebetween; and synchronizing the output timings of the first and second control signals CS1 and CS2 with each other.

In addition, unless specified otherwise in each embodiment, the synchronization process may be performed: (1) constantly at each pulse edge representing rising or falling timing of a pulse signal or at each timing where a parameter relating to synchronization information reaches a predetermined value; (2) in a predetermined cycle; (3) on an irregular basis; or (4) only once at the time of activation of the drive system.

In the first to the fourth embodiments, the CPUs 41 and 42 are synchronized using rotation angle information on the electrical angle $\theta$ of the MG 80. That is, in the present embodiment, the rotation angle signal SGN_θ corresponds to both "synchronization information" and "rotation angle information".

Hereinafter, explanation is made on how to synchronize, when deviation of timings has occurred between the first CPU 41-side signal and the second CPU 42-side signal, the timings between the two signals by shifting the second CPU 42-side signal with reference to the first CPU 41-side signal. However, it should be noted that the timings may alternatively be synchronized by shifting the first CPU 41-side signal with reference to the second CPU 42-side signal. The above is the same in the second embodiment and so forth.

Figure 3:
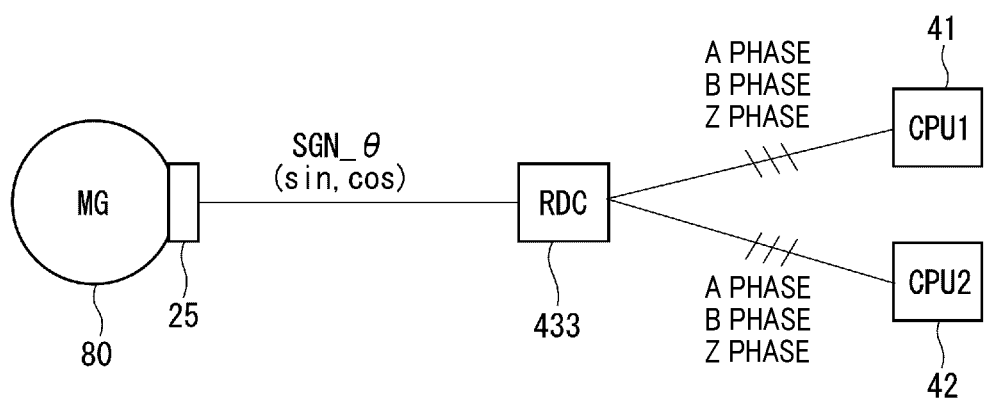
FIG. 3 is a schematic diagram illustrating the output of signals from a rotation angle sensor to first and second CPUs via a resolver-to-digital converter in the control apparatus according to the first embodiment.
Figure 4A:
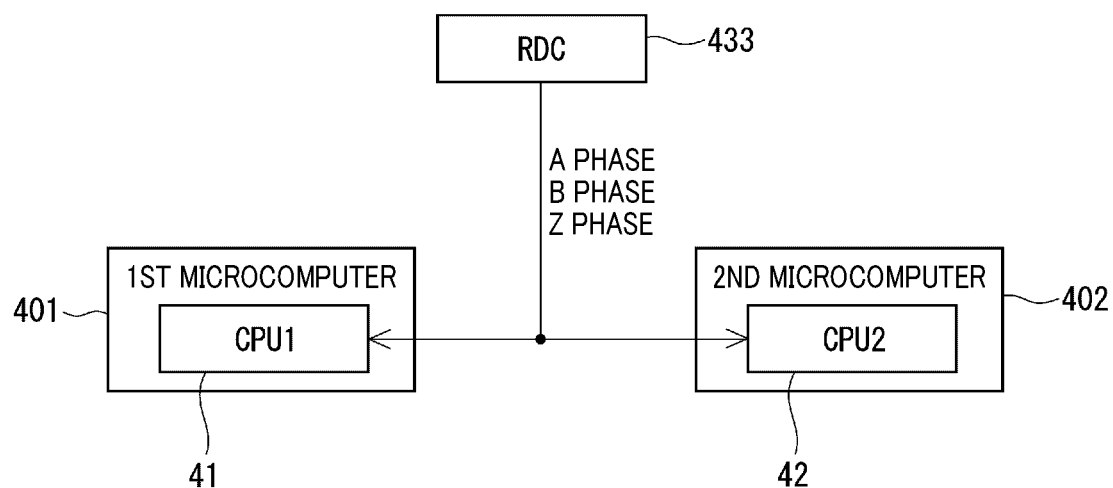
FIG. 4A is a schematic diagram illustrating the output of signals from the resolver-to-digital converter to the first and second CPUs in the control apparatus according to the first embodiment.

As shown in FIG. 3 and FIG. 4A, the rotation angle signal SGN_θ is an analog signal which includes a sin signal and a cos signal. The ECU 400 includes a resolver-to-digital converter 433 which will be briefly referred to as "RDC 433" hereinafter. The RDC 433 converts the sin and cos signals of the rotation angle signal SGN_θ outputted from the rotation angle sensor 25 into digital pulse signals of A, B and Z phases. The A-phase, B-phase and Z-phase digital pulse signals are then outputted to the CPUs 41 and 42. That is, the digital pulse signals corresponding to the electrical angle θ of the MG 80 are branched and inputted to both the CPUs 41 and 42.

In addition, the output signals of the RDC 433 actually represent the resolver angle. In the present embodiment, the number of pole pairs of the resolver (i.e., the rotation angle sensor 25) is equal to the number of pole pairs of the MG 80; therefore, the resolver angle is equal to the electrical angle θ of the MG 80. However, the number of pole pairs of the resolver may alternatively be different from the number of pole pairs of the MG 80; in this case, the electrical angle θ of the MG 80 can be converted from the resolver angle based on the ratio between the number of pole pairs of the resolver and the number of pole pairs of the MG 80.

Figure 4B:
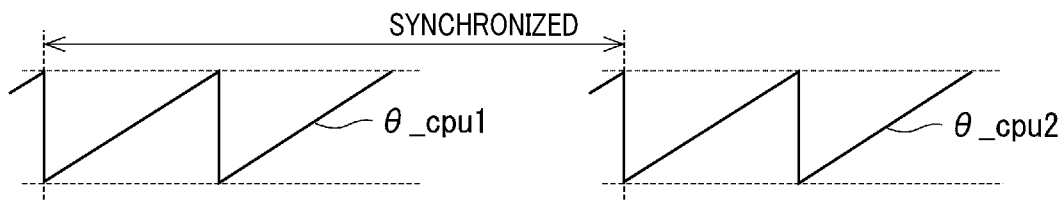
FIG. 4B is an explanatory diagram illustrating the synchronization of electrical angles in the first and second CPUs in the control apparatus according to the first embodiment.

With the use of the branched digital pulse signals in the CPUs 41 and 42, the electrical angle θ_cpu1 in the first CPU 41 and the electrical angle θ_cpu2 in the second CPU 42 are synchronized with each other as shown in FIG. 4B. Consequently, control timings are always synchronized between the first and second CPUs 41 and 42. That is, by allowing the first and second CPUs 41 and 42 to recognize the same angle, it becomes possible to synchronize control timings between the CPUs 41 and 42 and thus becomes possible to synchronize switching timings between the inverters 60 and 70. As a result, it becomes possible to suitably control drive of the MG 80 with the synchronized switching timings in the inverters 60 and 70. In addition, the above is the same in the second to the fourth embodiments.

As described above, in the present embodiment, the control apparatus 1 is provided to control drive of the MG 80 that has the U-phase, V-phase and W-phase coils 81, 82 and 83. The control apparatus 1 includes the first inverter 60, the second inverter 70 and the first and second microcomputers 401 and 402. The first inverter 60 is connected with the first ends 811, 821 and 831 of the U-phase, V-phase and W-phase coils 81, 82 and 83. The first inverter 60 has the first switching elements 61-66 each corresponding to one of the U-phase, V-phase and W-phase coils 81, 82 and 83. The second inverter 70 is connected with the second ends 812, 822 and 832 of the U-phase, V-phase and W-phase coils 81, 82 and 83. The second inverter 70 includes the second switching elements 71-76 each corresponding to one of the U-phase, V-phase and W-phase coils 81, 82 and 83. The first microcomputer 401 includes the first CPU 41 that is configured to generate the first control signal CS1 for control of the first inverter 60. The second microcomputer 402 includes the second CPU 42 that is configured to generate the second control single CS2 for control of the second inverter 70.

Moreover, in the present embodiment, the control apparatus 1 is configured so that the switching timings are synchronized, on the basis of the synchronization information, between the first and second inverters 60 and 70. Consequently, it becomes possible for the control apparatus 1 to suitably control drive of the MG 80 without causing problems, such as decrease in the output of the MG 80, to occur due to deviation of the switching timings. As a result, it becomes possible to drive the MG 80 in an intended manner.

In the present embodiment, as shown in FIG. 1, the control apparatus 1 (more specifically, the ECU 400) includes both the first microcomputer 401 having the first CPU 41 provided therein and the second microcomputer 402 having the second CPU 42 provided therein. The second microcomputer 402 is provided separately from the first microcomputer 401. Consequently, with the two microcomputers 401 and 402, it becomes possible to build a redundant system which can continue, when one of the microcomputers 401 and 402 malfunctions, control of the MG 80 by the other of the microcomputers 401 and 402. Moreover, it also becomes possible to improve the reliability of the control apparatus 1 through mutual monitoring of the first and second microcomputers 401 and 402.

On the other hand, in the modification shown in FIG. 2, both the first CPU 41 and the second CPU 42 are provided in the single microcomputer 403. Consequently, it becomes possible to improve the design flexibility and reduce the size of the control apparatus 1 in comparison with the configuration shown in FIG. 1.

In the present embodiment, the synchronization information is the rotation angle information based on the detection result of the rotation angle sensor 25 that is configured to detect the electrical angle θ representing the rotational position of the MG 80. More particularly, in the present embodiment, the A-phase, B-phase and Z-phase digital pulse signals outputted from the RDC 433 constitute "the same rotation angle information" that is branched and inputted to both the first and second CPUs 41 and 42. Consequently, with the same rotation angle information recognized by both the first and second CPUs 41 and 42, it becomes possible to synchronize the electrical angle θ_cpu1 in the first CPU 41 with the electrical angle θ_cpu2 in the second CPU 42, thereby making it possible to synchronize switching timings between the inverters 60 and 70.

In the present embodiment, the first inverter 60 is connected with the first battery 11, and the second inverter 70 is connected with the second battery 12 that is insulated from the first battery 11. Consequently, it becomes possible to drive the MG 80 with both electric power from the first battery 11 and electric power from the second battery 12. In particular, by driving the MG 80 with the two batteries 11 and 12 serialized through switching control (e.g., the inverse SW control), it becomes possible to increase the output of the MG 80.

Second Embodiment

Figure 5:
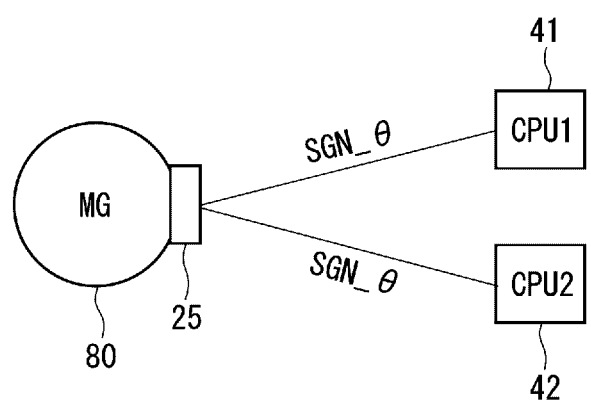
FIG. 5 is a schematic diagram illustrating the output of signals from a rotation angle sensor to first and second CPUs in a control apparatus according to a second embodiment.

In the second embodiment, as shown in FIG. 5, the rotation angle signal SGN_θ outputted from the rotation angle sensor 25 is directly branched and inputted to both the first and second CPUs 41 and 42 without passing through an RDC (Resolver-to-Digital Converter). That is, when the rotation angle sensor 25 is constituted of a resolver, to the CPUs 41 and 42, there are inputted analog signals from the rotation angle sensor 25. In addition, though not shown in FIG. 5, each of the CPUs 41 and 42 may have one RDC either built therein or provided separately therefrom. The above is the same in the third and fourth embodiments.

With the above configuration, it is possible to synchronize the electrical angle Θ_cpu1 in the first CPU 41 with the electrical angle θ_cpu2 in the second CPU 42. Consequently, it is possible to achieve the same advantageous effects as in the first embodiment.

Third Embodiment

Figure 6:
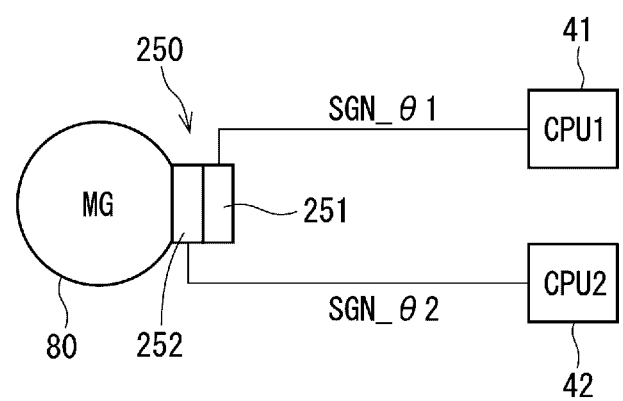
FIG. 6 is a schematic diagram illustrating the output of signals from a rotation angle sensor to first and second CPUs in a control apparatus according to a third embodiment.

In the third embodiment, as shown in FIG. 6, the rotation angle sensor 250 includes a first sensor unit 251 and a second sensor unit 252. Each of the first and second sensor units 251 and 252 is configured to detect the electrical angle θ of the MG 80. A first rotation angle signal SGN_θ1 is outputted from the first sensor unit 251 to the first CPU 41 while a second rotation angle signal SGN_θ2 is outputted from the second sensor unit 252 to the second CPU 42. In the present embodiment, the rotation angle signals SGN_θ1 and SGN_θ2 together correspond to both "synchronization information" and "rotation angle information".

The first and second sensor units 251 and 252 have the same configuration and detect the rotating state of the same MG 80. Therefore, the first rotation angle signal SGN_θ1 outputted from the first sensor unit 251 and the second rotation angle signal SGN_θ2 outputted from the second sensor unit 252 are substantially identical to each other. Consequently, the electrical angle θ_cpu in the first CPU 41 and the electrical angle θ_cpu2 in the second CPU 42 are synchronized with each other. As a result, it is possible to achieve the same advantageous effects as in the previous embodiments.

Figure 7:
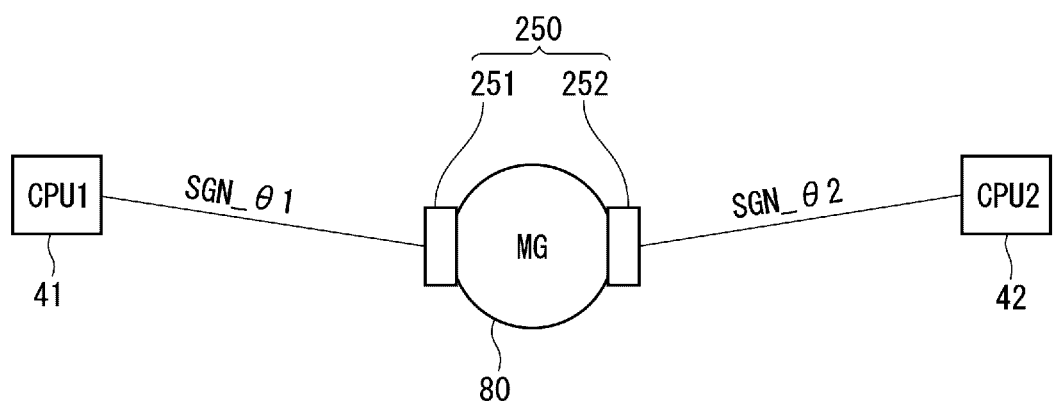
FIG. 7 is a schematic diagram illustrating the output of signals from a rotation angle sensor to first and second CPUs in a control apparatus according to a modification of the third embodiment.

In addition, in the present embodiment, as shown in FIG. 6, the first and second sensor units 251 and 252 are provided integrally with each other. However, as shown in FIG. 7, the first and second sensor units 251 and 252 may alternatively be provided separately from each other.

Fourth Embodiment

Figure 8:
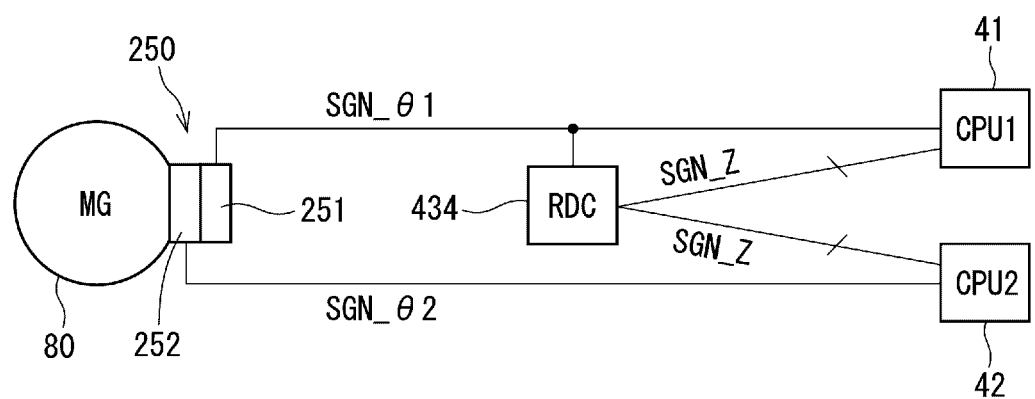
FIG. 8 is a schematic diagram illustrating the output of signals from a rotation angle sensor to first and second CPUs in a control apparatus according to a fourth embodiment.

In the fourth embodiment, as shown in FIG. 8, first and second rotation angle signals SGN_θ1 and SGN_θ2 from first and second sensor units 251 and 252 of the rotation angle sensor 250 are respectively inputted to the first and second CPUs 41 and 42, as in the third embodiment. Moreover, in the ECU 400, there is provided a synchronization RDC 434 in addition to RDCs (not shown) provided respectively for the first and second CPUs 41 and 42. The synchronization RDC 434 is configured to: acquire the first rotation angle signal SGN_θ1 or the second rotation angle signal SGN_θ2 (more particularly, the first rotation angle signal SGN_θ1 in the present embodiment); convert the acquired rotation angle signal into an angle reference signal SGN_Z which is a digital signal; and output the angle reference signal SGN_Z to both the first and second CPUs 41 and 42.

In addition, in the present embodiment, the rotation angle sensor 250 is implemented by a resolver; the angle reference signal SGN_Z is constituted of a Z-phase digital pulse signal. It should be noted that the angle reference signal may alternatively be constituted of a signal other than the Z-phase digital pulse signal.

The angle reference signal SGN_Z, which is converted from the single rotation angle signal, is branched and inputted to both the first and second CPUs 41 and 42. Consequently, with the angle reference signal SGN_Z, it becomes possible to correct detection errors of the first and second sensor units 251 and 252 due to the manufacturing tolerances, thereby improving the synchronization accuracy.

In the present embodiment, control timings are always synchronized between the first and second CPUs 41 and 42. Moreover, error correction is performed at rising or falling timings of the Z-phase digital pulse signal. In addition, in the present embodiment, the angle reference signal SGN_Z and the first and second rotation angle signals SGN_θ1 and SGN_θ2 together correspond to "synchronization information".

As described above, in the present embodiment, the rotation angle sensor 250 includes both the first sensor unit 251 configured to output to the first CPU 41 the first rotation angle signal SGN 01 which corresponds to the rotation angle information and the second sensor unit 252 configured to output to the second ECU 42 the second rotation angle signal SGN_θ2 which also corresponds to the rotation angle information. The synchronization information includes the angle reference signal SGN_Z which is generated based on the first rotation angle signal SGN_θ1 or the second rotation angle signal SGN_θ2. The angle reference signal SGN_Z is branched and inputted to both the first and second CPUs 41 and 42. Consequently, with the angle reference signal SGN_Z, it becomes possible to correct deviation due to detection errors of the first and second sensor units 251 and 252, thereby improving the synchronization accuracy. In addition, it is also possible to achieve the same advantageous effects as in the previous embodiments.

Fifth Embodiment

Figure 9A:
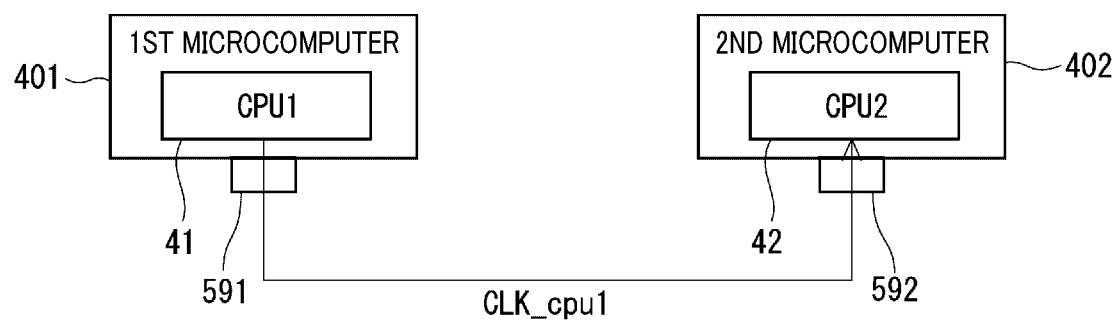
FIG. 9A is a schematic diagram illustrating the output of a clock signal from a first CPU to a second CPU in a control apparatus according to a fifth embodiment.
Figure 9B:
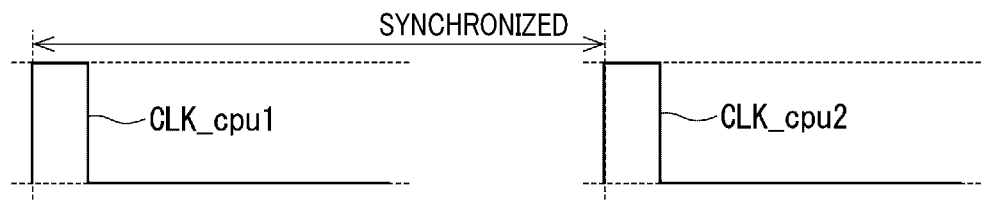
FIG. 9B is an explanatory diagram illustrating the synchronization of clock signals generated in the first and second CPUs in the control apparatus according to the fifth embodiment.

In the fifth embodiment, as shown in FIGS. 9A-9B, control timings are synchronized between the first and second microcomputers 401 and 402 using signals generated in the microcomputers 401 and 402.

Specifically, as shown in FIG. 9A, the first microcomputer 401 has a port 591 and the second microcomputer 402 has a port 592. The ports 591 and 592 are configured to be capable of transmitting and receiving signals. In addition, the ports 591 and 592 may be directly connected with each other by wiring or configured in a software manner so as to be capable of communicating with each other.

In the present and subsequent embodiments, explanation will be mainly made of examples where: the first CPU 41 serves as a "master circuit" while the second CPU 42 serves as a "slave circuit"; and the first CPU 41 transmits synchronization information to the second CPU 42 and then the second CPU 42 performs a synchronization process such as a timing adjustment. It should be noted that the second CPU 42 may alternatively serve as a "master circuit" and the first CPU 41 may alternatively serve as a "slave circuit". Moreover, it also should be noted that the CPUs 41 and 42 may alternatively be configured to mutually transmit and receive synchronization information. In addition, even in the case of the CPUs 41 and 42 mutually transmitting and receiving synchronization information, it is still possible to regard one of the CPUs 41 and 42 as a "master circuit" and the other of the CPUs 41 and 42 as a "slave circuit".

In the present embodiment, both a clock signal CLK_cpu1 generated in the first CPU 41 and a clock signal CLK_cpu2 generated in the second CPU 42 correspond to "synchronization information". Control timings are operated using the clock signals CLK_cpu1 and CLK_cpu2. Moreover, the clock signal CLK_cpu1 generated in the first CPU 41 is outputted, via the ports 591 and 592, to the second CPU

42. It should be noted that the clock signals CLK_cpu1 and CLK_cpu2 may have any suitable frequency.

As shown in FIG. 9B, the second CPU 42 corrects clock deviation by comparing rising or falling timings of the pulses of the clock signal CLK_cpu1 acquired from the first CPU 41 and the clock signal CLK_cpu2 generated therein. That is, the first CPU 41 transmits the clock signal CLK_cpu1 to the second CPU 42, causing the second CPU 42 to synchronize the clock signal CLK_cpu2 with the clock signal CLK_cpu1. It should be noted that the clock signals may be minimum operational clock signals or operational clock signals accumulated for calculating control timings and/or periods. It also should be noted that the multiplier number of the clock signals used is not particularly limited.

In the case of employing high-speed hardware such as an FPGA for the signal transmission and reception, the communication delay may be considered to be substantially 0. Moreover, in the case where there occurs a communication delay or response delay, the synchronization process may be performed through correction by taking into account the delay. The above is the same in the other embodiments.

As described above, in the present embodiment, the first CPU 41 which is the master circuit outputs its own synchronization information to the second CPU 42 which is the slave circuit. The second CPU 42 performs, based on the synchronization information acquired from the first CPU 41 and its own corresponding synchronization information, the synchronization process for synchronizing switching timings between the first and second inverters 60 and 70. Consequently, it becomes possible to suitably synchronize switching timings between the first and second inverters 60 and 70.

In the present embodiment, the synchronization information of the first CPU 41 is the clock signal CLK_cpu1 generated in the first CPU 41, and the synchronization information of the second CPU 42 is the clock signal CLK_cpu2 generated in the second CPU 42. As the synchronization process, the second CPU 42 corrects clock deviation between the first CPU 41 and the second CPU 42 (or deviation between the clock signals CLK_cpu1 and CLK_cpu2). Consequently, the clock signals CLK_cpu1 and CLK_cpu2 are synchronized with each other, thereby making it possible to suitably synchronize switching timings between the first and second inverters 60 and 70. In addition, it is also possible to achieve the same advantageous effects as in the previous embodiments.

Sixth Embodiment

Figure 10A:
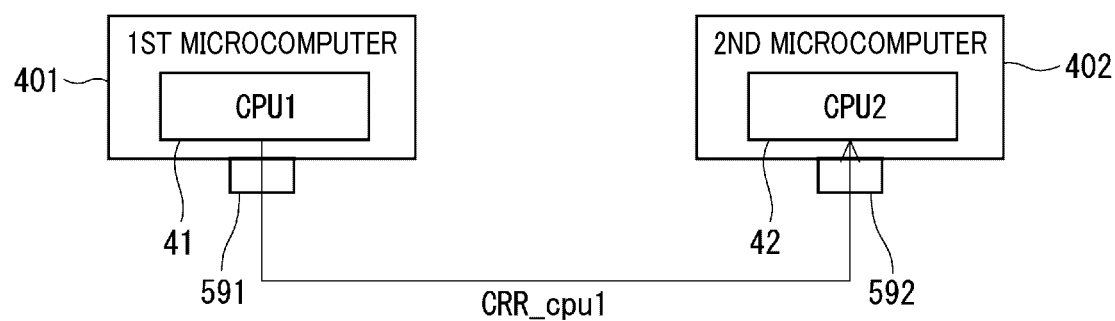
FIG. 10A is a schematic diagram illustrating the output of a carrier signal from a first CPU to a second CPU in a control apparatus according to a sixth embodiment.
Figure 10B:
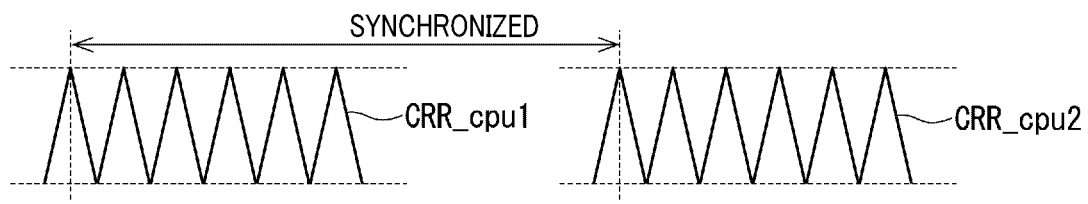
FIG. 10B is an explanatory diagram illustrating the synchronization of carrier signals generated in the first and second CPUs in the control apparatus according to the sixth embodiment.
Figure 11:
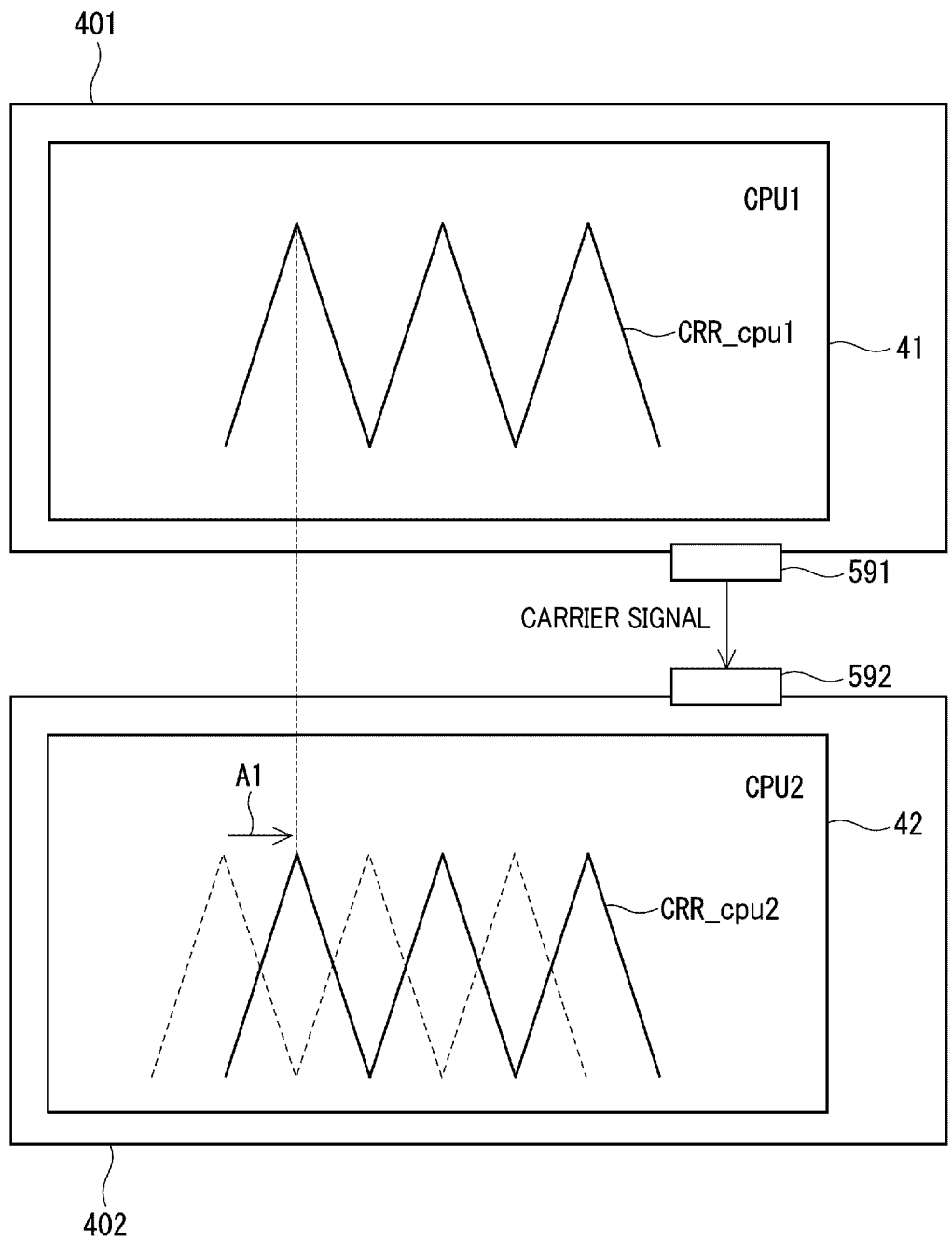
FIG. 11 is an explanatory diagram illustrating the shifting of the phase of the carrier signal generated in the second CPU so as to be coincident with the phase of the carrier signal generated in the first CPU in the control apparatus according to the sixth embodiment.

In the sixth embodiment, as shown in FIGS. 10A-10B and 11, both a carrier signal CRR_cpu1 generated in the first CPU 41 for PWM (Pulse-Width Modulation) control and a carrier signal CRR_cpu2 generated in the second CPU 42 for PWM control correspond to "synchronization information". Control timings are corrected based on the carrier signals CRR_cpu1 and CRR_cpu2.

Specifically, as shown in FIG. 10A, the carrier signal CRR_cpu1 generated in the first CPU 41 is outputted, via the ports 591 and 592, to the second CPU 42. Then, as shown in FIG. 10B, the second CPU 42 compares a predetermined timing of the carrier signal CRR_cpu1 acquired from the first CPU 41 (e.g., a ridge timing at which the signal reaches its ridge, a valley timing at which the signal reaches its valley, or a zero-cross timing at which the signal crosses its center of zero) with that of its own carrier signal CRR_cpu2, and shifts the phase of the carrier signal CRR_cpu2 to make the timings of the carrier signals CRR_cpu1 and CRR_cpu2 coincident with each other. More particularly, in the present embodiment, as indicated with an arrow A in FIG. 11, the phase of the carrier signal CRR_cpu2 is shifted to make ridge timings of the carrier signals CRR_cpu1 and CRR_cpu2 coincident with each other. In addition, in FIG. 11, the carrier signal CRR_cpu2 before the phase shifting is shown with a dashed line whereas the carrier signal CRR_cpu2 after the phase shifting is shown with a solid line.

As described above, in the present embodiment, the synchronization information of the first CPU 41 is the carrier signal CRR_cpu1 generated in the first CPU 41 for PWM control, and the synchronization information of the second CPU 42 is the carrier signal CRR_cpu2 generated in the second CPU 42 for PWM control. As the synchronization process, the second CPU 42 shifts the phase of the carrier signal CRR_cpu2 to make the phases of the carrier signals CRR_cpu1 and CRR_cpu2 coincident with each other. Consequently, the carrier signals CRR_cpu1 and CRR_cpu2 are synchronized with each other, thereby making it possible to suitably synchronize switching timings between the first and second inverters 60 and 70. In addition, it is also possible to achieve the same advantageous effects as in the previous embodiments.

Seventh Embodiment

Figure 12:
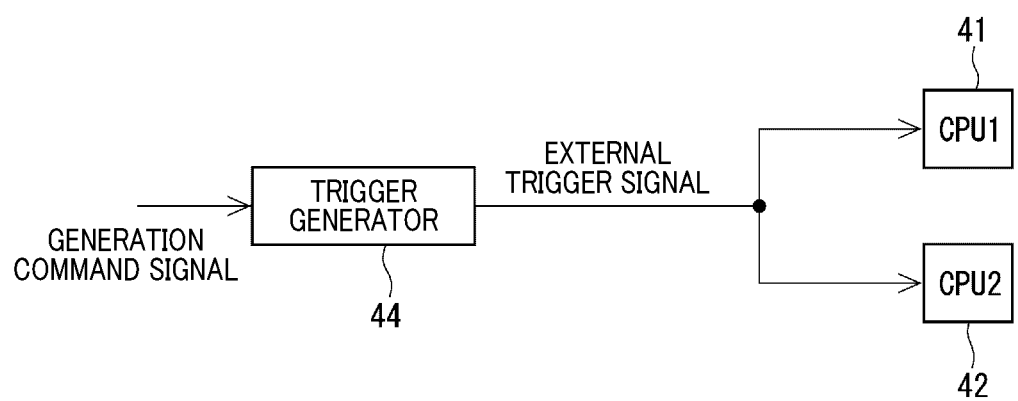
FIG. 12 is a schematic diagram illustrating the output of an external trigger signal from a trigger generator to first and second CPUs in a control apparatus according to a seventh embodiment.

In the seventh embodiment, as shown in FIG. 12, a trigger generator 44 is provided in the ECU 400 (not shown in FIG. 12). The trigger generator 44 is configured to generate, based on a generation command signal transmitted from the first CPU 41 or the second CPU 42, an external trigger signal and transmit the generated external trigger signal to both the first and second CPUs 41 and 42. Then, based on the external trigger signal, the first and second CPUs 41 and 42 correct deviation of control timings. In addition, in the present embodiment, the external trigger signal generated by the trigger generator 44 corresponds to "synchronization information".

The external trigger signal may be generated in a hardware manner by a circuit component or in a software manner by a microcomputer provided separately from both the first and second microcomputers 401 and 402. That is, the trigger generator 44 may be implemented by a circuit component or a microcomputer.

As described above, in the present embodiment, the synchronization information is the external trigger signal generated by the trigger generator 44 that is provided separately from both the first and second CPUs 41 and 42. Based on the external trigger signal, the first and second CPUs 41 and 42 perform the synchronization process for synchronizing switching timings between the first and second inverters 60 and 70. Consequently, it becomes possible to suitably synchronize switching timings between the first and second inverters 60 and 70 using the common external trigger signal to the first and second CPUs 41 and 42. In addition, it is also possible to achieve the same advantageous effects as in the previous embodiments.

Eighth Embodiment

Figure 13:
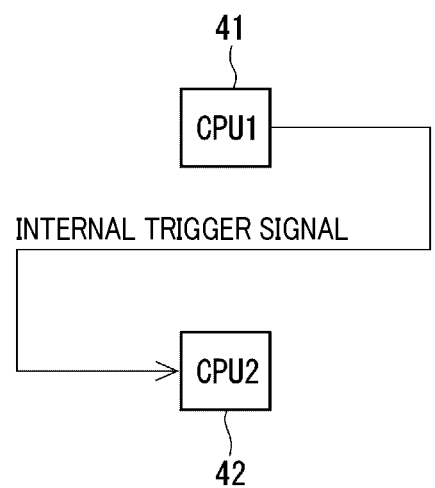
FIG. 13 is a schematic diagram illustrating the output of an internal trigger signal from a first CPU to a second CPU in a control apparatus according to an eighth embodiment.

In the eighth embodiment, as shown in FIG. 13, the first CPU 41 generates an internal trigger signal, which is a signal relating to control information, and transmits the generated internal trigger signal to the second CPU 42. The control information may include information on electric current, information on a voltage and information on the rotation angle of the MG 80. Alternatively, the control information may be information on various parameters available for timing adjustment and common to both the first and second CPUs 41 and 42. In addition, information on electric current or a voltage may be, for example, information on a direct current component, information on an alternating current component or information on phase or amplitude.

In the present information, the internal trigger signal is generated based on control information used for generation of the control signals CS1 and CS2. The trigger signal corresponds to "synchronization information". The first CPU 41 generates the internal trigger signal and outputs it to the second CPU 42. Based on the internal trigger signal, the second ECU 42 performs the synchronization process for synchronizing switching timings between the first and second inverters 60 and 70. Consequently, it becomes possible to suitably synchronize switching timings between the first and second inverters 60 and 70 using the internal trigger signal. In addition, it is also possible to achieve the same advantageous effects as in the previous embodiments.

Ninth Embodiment

Figure 14:
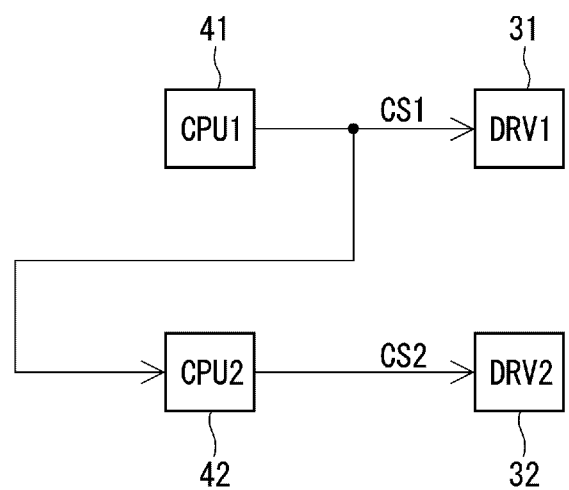
FIG. 14 is a schematic diagram illustrating the synchronization of control signals generated in first and second CPUs in a control apparatus according to a ninth embodiment.

In the ninth embodiment, the control signals CS1 and CS2 together correspond to "synchronization information". As shown in FIG. 14, the first control signal CS1 is outputted from the first CPU 41 to both the first driver circuit 31 and the second CPU 42. Then, based on the first control signal CS1, the second CPU 42 corrects the output timing of the second control signal CS2 that is outputted from the second CPU 42.

In the present embodiment, the output timings of the control signals CS1 and CS2 are corrected using the control signals CS1 and CS2 themselves. The first control signal CS1 is generated by the first CPU 41 for controlling drive of the first inverter 60 (more specifically, the on/off operation of the switching elements 61-66 of the first inverter 60) according to the control mode. The second control signal CS2 is generated by the second CPU 42 for controlling drive of the second inverter 70 (more specifically, the on/off operation of the switching elements 71-76 of the second inverter 70) according to the control mode. More particularly, in the inverse SW control described in the first embodiment, the switching element 61 of the first inverter 60 and the switching element 74 of the second inverter 70 are turned on and off at the same time. Therefore, in the present embodiment, the output timing of the second control signal CS2 generated for controlling the on/off operation of the switching element 74 of the second inverter 70 is corrected based on the first control signal CS1 generated for controlling the on/off operation of the switching element 61 of the first inverter 60. Consequently, it becomes possible to suitably synchronize switching timings between the switching element 61 of the first inverter 60 and the switching element 74 of the second inverter 70 which should be turned on and off at the same time. In addition, the output timing correction may also be performed to synchronize switching timings between any other pair of the switching elements of the first and second inverters 60 and 70 which should be turned on and off at the same time.

As described above, in the present embodiment, the synchronization information is the first and second control signals CS1 and CS2. As the synchronization process, the second CPU 42 performs the output timing adjustment to make the output timings of the first and second control signals CS1 and CS2 coincident with each other. Consequently, it becomes possible to suitably synchronize switching timings between the first and second inverters 60 and 70 using the first and second control signals CS1 and CS2. In addition, it is also possible to achieve the same advantageous effects as in the previous embodiments.

Tenth Embodiment

Figure 15:
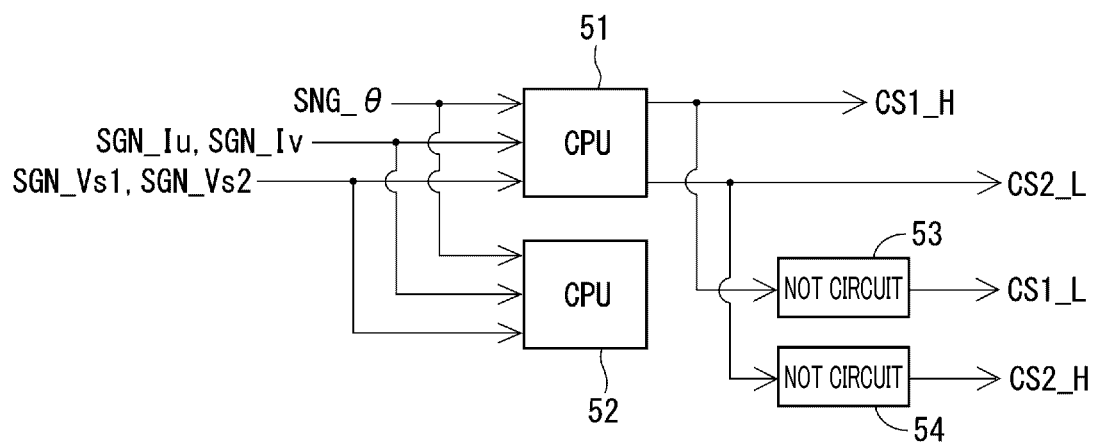
FIG. 15 is a schematic diagram illustrating the synchronization of control signals using NOT circuits in a control apparatus according to a tenth embodiment.

In the tenth embodiment, as shown in FIG. 15, both a main ECU 51 and a sub-ECU 52 are provided in the ECU 400 (not shown in FIG. 15). When the main ECU 51 is in a normal state, both the first control signal CS1 for drive control of the first inverter 60 and the second control signal CS2 for drive control of the second inverter 70 are generated by the main ECU 51. That is, in the present embodiment, the main CPU 51, which is an operation circuit (or arithmetic and logic unit), can be regarded as including both a "first operation circuit" configured to generate the first control signal CS1 and a "second operation circuit" configured to generate the second control signal CS2. On the other hand, the sub-ECU 52 is also capable of generating the control signals CS1 and CS2. When the main ECU 51 is in an abnormal state, the sub-ECU 52 generates and outputs the control signals CS1 and CS2 instead of the main ECU 51.

Hereinafter, the first control signal CS1 for drive of the upper-arm switching elements 61-63 of the first inverter 60 will be referred to as first upper-arm control signal CS1_H; the first control signal CS1 for drive of the lower-arm switching elements 64-66 of the first inverter 60 will be referred to as first lower-arm control signal CS1_L; the second control signal CS2 for drive of the upper-arm switching elements 71-73 of the second inverter 70 will be referred to as second upper-arm control signal CS2_H; and the second control signal CS2 for drive of the lower-arm switching elements 74-77 of the second inverter 70 will be referred to as second lower-arm control signal CS2_L.

The main CPU 51 generates both the control signal for drive of the upper-arm switching elements of one of the two inverters 60 and 70 and the control signal for drive of the lower-arm switching elements of the other of the two inverters 60 and 70. More particularly, in the example shown in FIG. 15, the main CPU 51 generates both the first upper-arm control signal CS1_H and the second lower-arm control signal CS2_L. In addition, in the inverse SW control described in the first embodiment, the first upper-arm control signal CS1_H and the second lower-arm control signal CS2_L are identical pulse signals.

The first upper-arm control signal CS1_H is inverted by a NOT (inverting) circuit 53, generating the first lower-arm control signal CS1_L. The second lower-arm control signal CS2_L is inverted by a NOT (inverting) circuit 54, generating the second upper-arm control signal CS2_H. In addition, each of the NOT circuits 53 and 54 may be a hardware circuit or a software circuit.

As described above, in the present embodiment, both the first operation circuit and the second operation circuit are included in the single main CPU 51 (or single operation circuit). The first control signal CS1 for control of the first inverter 60 includes the first upper-arm control signal CS1_H for control of the upper arm of the first inverter 60 and the first lower-arm control signal CS1_L for control of the lower arm of the first inverter 60. The second control signal CS2 for control of the second inverter 70 includes the second upper-arm control signal CS2_H for control of the upper arm of the second inverter 70 and the second lower-arm control signal CS2_L for control of the lower arm of the second inverter 70. The main CPU 51 generates one of a first signal pair consisting of the first upper-arm control signal CS1_H and the second lower-arm control signal CS2_L and a second signal pair consisting of the first lower-arm control signal CS1_L and the second upper-arm control signal CS2_H. The other of the first and second signal pairs is generated by inverting the one of the first and second signal pairs which is generated by the main CPU 51. With the above configuration, it is possible to suitably synchronize switching timings between the first and second inverters 60 and 70. Moreover, it is also possible to reduce the number of the control signals generated by the main CPU 51 in the inverse SW control. In addition, it is also possible to achieve the same advantageous effects as in the previous embodiments.

Eleventh Embodiment

Figure 16:
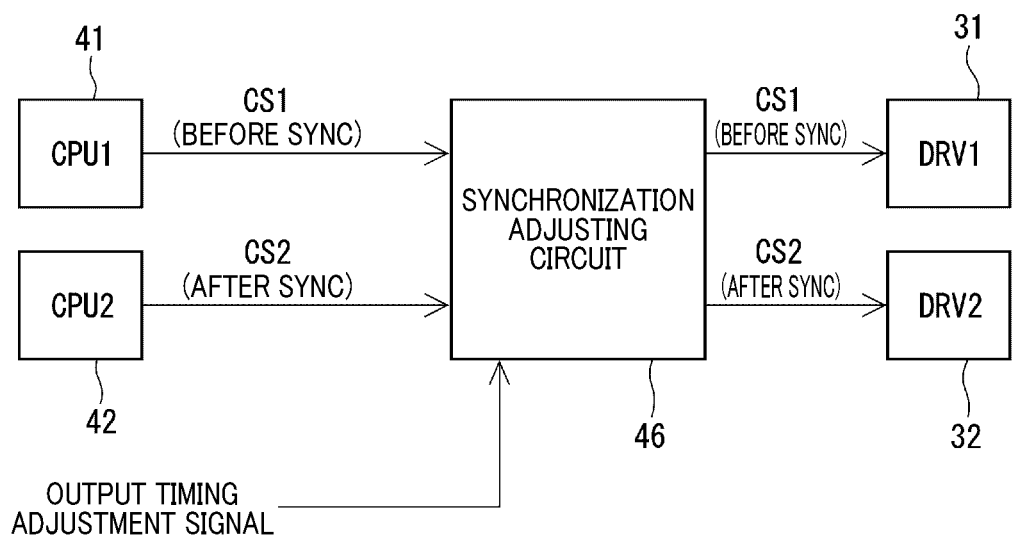
FIG. 16 is a schematic diagram illustrating the synchronization of control signals by a synchronization adjusting circuit using an output timing adjustment signal in a control apparatus according to an eleventh embodiment.

In the eleventh embodiment, as shown in FIG. 16, a synchronization adjusting circuit 46 is provided in the ECU 400 (not shown in FIG. 16). To the synchronization adjusting circuit 46, there are inputted both the first control signal CS1 from the first CPU 41 and the second control signal CS2 from the second CPU 42. Moreover, an output timing adjustment signal is also inputted to the synchronization adjusting circuit 46. The output timing adjustment signal may be a signal outputted from one of the first and second CPUs 41 and 42, or a signal outputted from a signal generator (not shown) provided separately from the first and second CPUs 41 and 42. In addition, in the present embodiment, the output timing adjustment signal corresponds to "synchronization information".

In the present embodiment, the synchronization adjusting circuit 46 outputs, when the inputted control signals CS1 and CS2 and the output timing adjustment signal have become synchronous with each other, the control signals CS1 and CS2 as synchronized control signals to the drive circuits 31 and 32, respectively. Consequently, the control signals CS1 and CS2 are synchronized with each other, thereby making it possible to suitably synchronize switching timings between the first and second inverters 60 and 70.

As described above, in the present embodiment, the ECU 400 includes the synchronization adjusting circuit 46 that synchronizes, based on the output timing adjustment signal, the first control signal CS1 outputted from the first CPU 41 and the second control signal CS2 outputted from the second CPU 42 with each other. Consequently, it becomes possible to suitably synchronize switching timings between the first and second inverters 60 and 70. In addition, it is also possible to achieve the same advantageous effects as in the previous embodiments.

Twelfth Embodiment

In the twelfth to the fourteenth embodiments, the synchronization process is performed with the synchronization information being current information on electric current. In addition, the synchronization process may be performed at any timing in a steady state where the electric current is stable.

Figure 17:
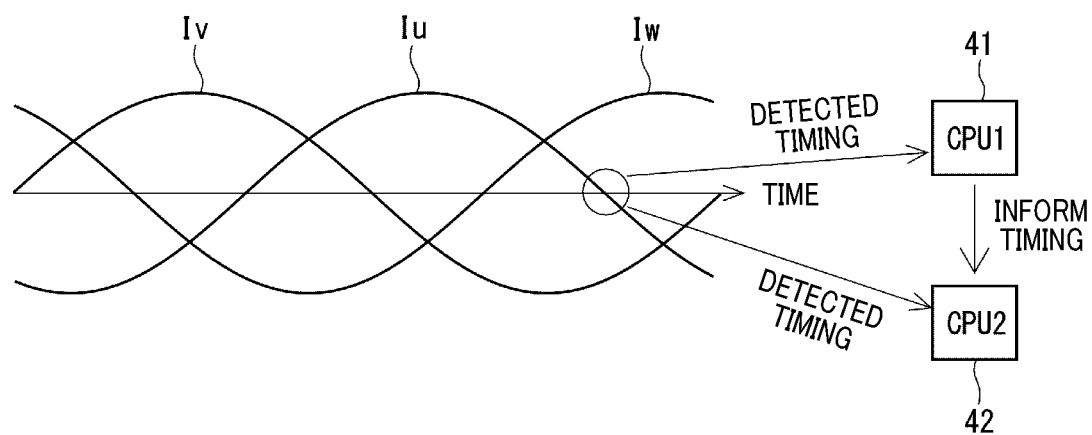
FIG. 17 is a schematic diagram illustrating a synchronization process based on comparison between a recognition timing at which a phase current reaching a predetermined value is recognized by a first CPU and a recognition timing at which the phase current reaching the predetermined value is recognized by a second ECU in a control apparatus according to a twelfth embodiment.

In the twelfth embodiment, as shown in FIG. 17, timing deviation is corrected based on at least one of the U-phase current Iu, the V-phase current Iv and the W-phase current Iw. Specifically, the phase currents Iu, Iv and Iw are common to the first and second inverters 60 and 70. Therefore, it is possible to: compare a recognition timing at which one of the phase currents Iu, Iv and Iw reaching a predetermined value is recognized by the first CPU 41 with a recognition timing at which the phase current reaching the predetermined value is recognized by the second CPU 42; and then correct deviation between the recognition timings. The predetermined value may be any value in the range from 0 to an upper or lower peak value of the phase current. More particularly, in the example shown in FIG. 17, both the CPUs 41 and 42 recognize a zero-cross timing of the U-phase current Iu at which the U-phase current Iu becomes equal to 0. The first CPU 41 informs the second CPU 42 of the recognition timing in the CPU 41 (i.e., the zero-cross timing of the U-phase current Iu recognized by the first CPU 41). Then, the second CPU 42 corrects deviation between the recognition timing in the first CPU 41 and the recognition timing in the second CPU 42 (i.e., the zero-cross timing of the U-phase current Iu recognized by the second CPU 42).

As described above, in the present embodiment, the synchronization information is coil-current information based on the detection result of the current sensor 21 that detects the U-phase current Iu supplied to the U-phase coil 81. Upon the U-phase current Iu reaching the predetermined value, the second CPU 42 performs the synchronization process based on both the timing at which the U-phase current Iu reaching the predetermined value is recognized by the first CPU 41 and the timing at which the U-phase current Iu reaching the predetermined value is recognized by the second CPU 42. Consequently, it becomes possible to suitably synchronize switching timings between the first and second inverters 60 and 70. Moreover, it is also possible to achieve the same advantageous effects as in the previous embodiments.

In addition, as an alternative, the coil-current information may be information on the V-phase current Iv or the W-phase current Iw. As another alternative, the coil-current information may be information on at least two of the U-phase current Iu, the V-phase current Iv and the W-phase current Iw.

Thirteenth Embodiment

Figure 18:
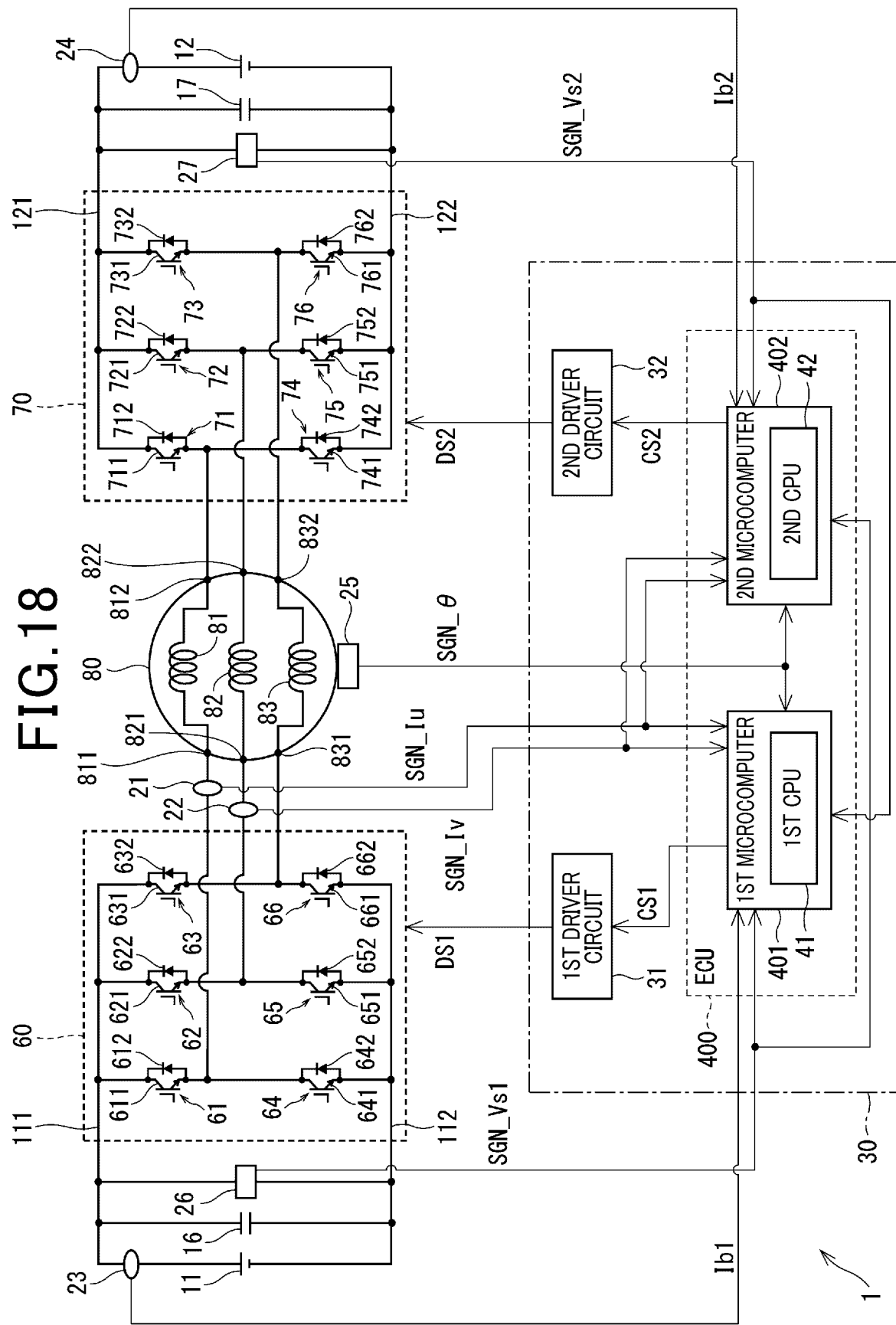
FIG. 18 is a schematic diagram illustrating the configuration of a control apparatus according to a thirteenth embodiment.

In the thirteenth embodiment, as shown in FIG. 18, a first bus current sensor 23 is provided to detect electric current flowing in the high-potential-side wiring 111 on the first inverter 60 side. The detection result of the first bus current sensor 23 is outputted to the first microcomputer 401. Moreover, a second bus current sensor 24 is provided to detect electric current flowing in the low-potential-side wiring 122 on the second inverter 70 side. The detection result of the second bus current sensor 24 is outputted to the second microcomputer 402. Hereinafter, the bus current on the first inverter 60 side will be referred to as first bus current Ib1 and the bus current on the second inverter 70 side will be referred to as second bus current Ib2. In addition, the sixth components of the bus currents Ib1 and Ib2 will be denoted respectively by $Ib1_{(6)}$ and $Ib2_{(6)}$.

Figure 19:
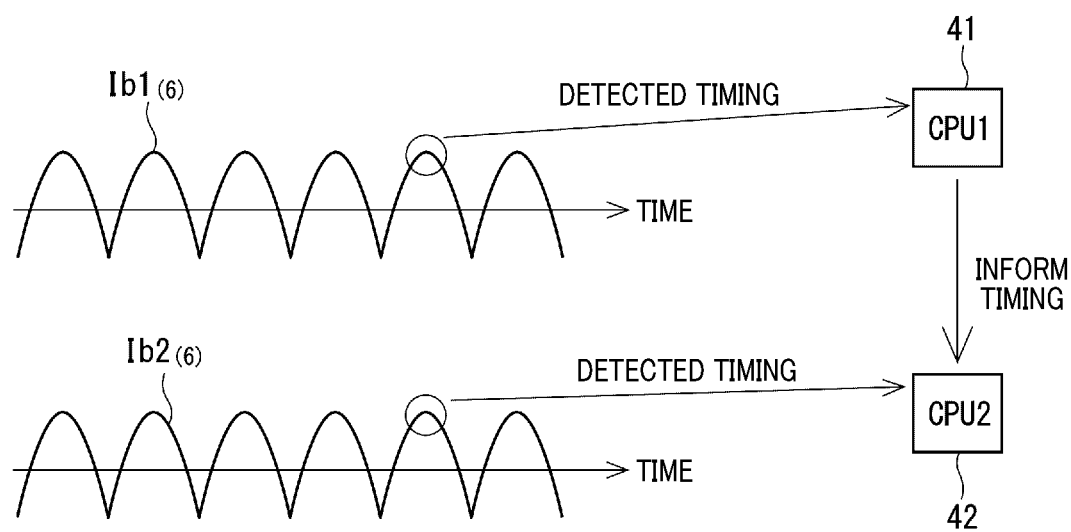
FIG. 19 is a schematic diagram illustrating a synchronization process based on comparison between a recognition timing at which the sixth component of first bus current reaching a peak is recognized by a first CPU and a recognition timing at which the sixth component of second bus current reaching a peak is recognized by a second CPU in the control apparatus according to the thirteenth embodiment.

The phase currents Iu, Iv and Iw are common to the first and second inverters 60 and 70. Therefore, even when the mean values of the bus currents Ib1 and Ib2 are different from each other, the sixth components $Ib1_{(6)}$ and $Ib2_{(6)}$ thereof are identical to each other. In view of the above, in the present embodiment, a recognition timing at which the sixth component $Ib1_{(6)}$ of the first bus current Ib1 reaching a peak is recognized by the first CPU 41 and a recognition timing at which the sixth component $Ib2_{(6)}$ of the second bus current Ib2 reaching a peak is recognized by the second CPU 42 are compared; then deviation between the recognition timings is corrected. The peak may be a ridge-side peak at which the sixth component turns from increase to decrease or a valley-side peak at which the sixth component turns from decrease to increase. More particularly, in the example shown in FIG. 19, the first CPU 41 informs the second CPU 42 of the recognition timing at which the sixth component $Ib1_{(6)}$ of the first bus current Ib1 reaching a ridge-side peak is recognized by the first CPU 41. Then, the second CPU 42 corrects deviation between the recognition timings in the first and second CPUs 41 and 42. In addition, the sixth component of an electric current can be regarded as a ripple component of the electric current; accordingly, the synchronization process according to the present embodiment can be regarded as being performed based on ripple components of the first and second bus currents Ib1 and Ib2.

As described above, in the present embodiment, the synchronization information is bus-current information based on the detection results of the bus current sensors 23 and 24 that respectively detect the bus currents Ib1 and Ib2. Upon the sixth component of each of the bus currents Ib1 and Ib2 reaching a peak, the second CPU 42 performs the synchronization process based on both the timing at which the sixth component reaching the peak is recognized by the first CPU 41 and the timing at which the sixth component reaching the peak is recognized by the second CPU 42. Consequently, it becomes possible to suitably synchronize switching timings between the first and second inverters 60 and 70. Moreover, it is also possible to achieve the same advantageous effects as in the previous embodiments.

In addition, it should be noted that the synchronization process may alternatively be performed using the nth components of the bus currents Ib1 and Ib2, where n is a natural number other than 6.

Fourteenth Embodiment

Figure 20:
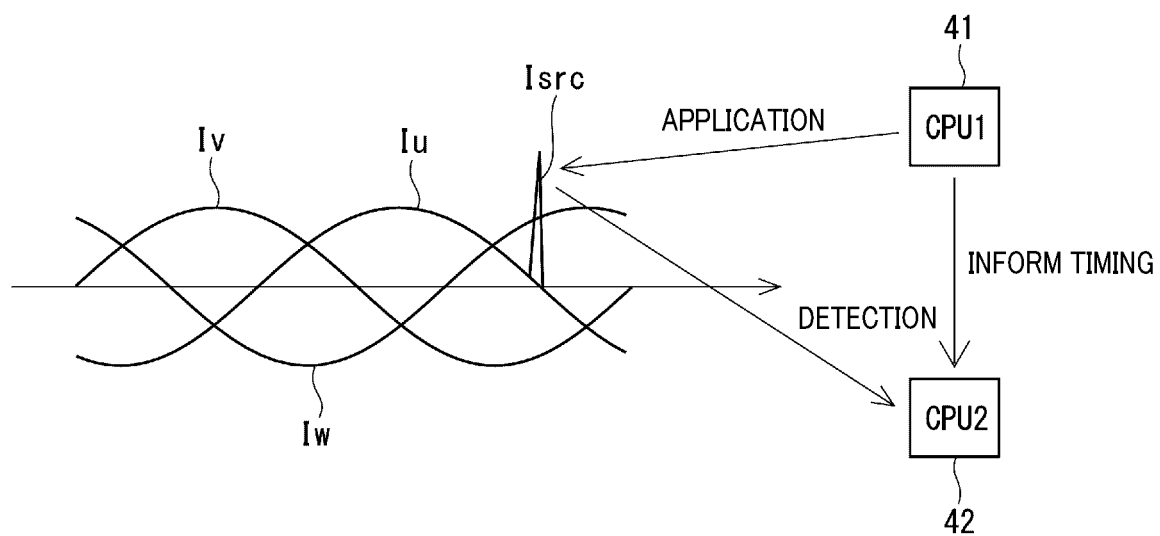
FIG. 20 is a schematic diagram illustrating a synchronization process based on comparison between an application timing at which a search current is applied by a first CPU and a detection timing at which the search current is detected by a second CPU in a control apparatus according to a fourteenth embodiment.

In the fourteenth embodiment, as shown in FIG. 20, a search current Isrc is applied to one of the U-phase, V-phase and W-phase coils 81-83 by a command from one of the CPUs 41 and 42 and the search current Isrc is detected by the other of the CPUs 41 and 42. More particularly, in the example shown in FIG. 20, a search current Isrc is applied to the U-phase coil 81 by a command from the first CPU 41. The second CPU 42 detects, based on the detection results of the current sensors 21 and 22, the search current Isrc. Moreover, the first CPU 41 informs the second CPU 42 of the timing at which the search current Isrc is applied. The second CPU 42 compares the timing at which the search current Isrc is applied with the timing at which the search current Isrc is detected, thereby correcting deviation between the timings.

In addition, in the example shown in FIG. 20, a surge current is applied as the search current Isrc to the U-phase coil 81. However, other currents, such as a zero-phase current, a harmonic current or a pulse current, may alternatively be applied as the search current Isrc. Moreover, the search current Isrc may be applied to the V-phase coil 82 or the W-phase coil 83 instead of the U-phase coil 81. Furthermore, the search current Isrc may be applied to at least two of the U-phase, V-phase and W-phase coils 81-83.

As described above, in the present embodiment, the synchronization information is information on the occurrence timing of the search current Isrc. The first CPU 41 applies the search current Isrc and informs the second ECU 42 of the timing at which the search current Isrc is applied. The second CPU 42 detects the search current Isrc and performs the synchronization process based on both the timing at which the search current Isrc is applied and the timing at which the search current Isrc is detected. Consequently, it becomes possible to suitably synchronize switching timings between the first and second inverters 60 and 70. In addition, it is also possible to achieve the same advantageous effects as in the previous embodiments.

Fifteenth Embodiment

Figure 21:
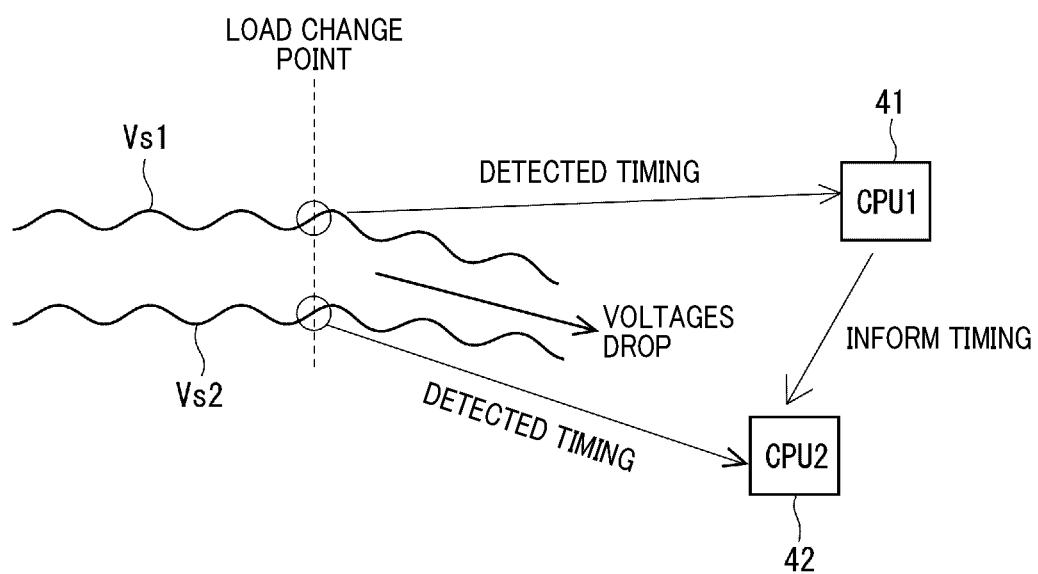
FIG. 21 is a schematic diagram illustrating a synchronization process based on comparison between timings at which changes in first and second input voltages are recognized respectively by first and second CPUs in a control apparatus according to the fifteenth embodiment.

As shown in FIG. 21, during operation of the MG 80 in a power running mode (or torque generation mode), the amount of electric power consumption by the MG 80 changes (more particularly, increases in the example shown in FIG. 21) at a load change point. In the present embodiment, the synchronization process is performed based on the input voltages Vs1 and Vs2. The input voltages Vs1 and Vs2 change (i.e., increase or decrease), regardless of whether they are represented by mean values or absolute values, according to the load state. Specifically, with increase in the amount of electric power consumption by the MG 80 in the power running mode, the input voltages Vs1 and Vs2 are lowered. Moreover, with increase in the amount of electric power supply by the MG 80 in a regenerative mode, the input voltages Vs1 and Vs2 increase. The timings at which the input voltages Vs1 and Vs2 reach a point of inflection are independent of whether the input voltages Vs1 and Vs2 are represented by mean values or absolute values. Moreover, the change timings of the input voltages Vs1 and Vs2 can be predicted based on change in, for example, the torque command value.

In view of the above, in the present embodiment, the first CPU 41 detects the timing at which the first input voltage Vs1 reaches a point of inflection and informs the second ECU 42 of the detected timing. The second CPU 42 compares the timing at which the first input voltage Vs1 reaches a point of inflection with the timing at which the second input voltage Vs2 reaches a point of inflection, thereby correcting deviations from the clocks to the control timings.

As described in the first embodiment, the control apparatus 1 includes both the first input voltage sensor 26 and the second input voltage sensor 27. The first input voltage sensor 26 detects the first input voltage Vs1 applied to the first inverter 60 and outputs the detection result to the first CPU 41. The second input voltage sensor 27 detects the second input voltage Vs2 applied to the second inverter 70 and outputs the detection result to the second CPU 42.

In the present embodiment, the synchronization information is input-voltage information on the first and second input voltages Vs1 and Vs2. The second CPU 42 performs the synchronization process based on both the timing at which change in the first input voltage Vs1 is recognized by the first CPU 41 and the timing at which change in the second input voltage Vs2 is recognized by the second CPU 42. Consequently, it becomes possible to suitably synchronize switching timings between the first and second inverters 60 and 70. In addition, it is also possible to achieve the same advantageous effects as in the previous embodiments.

Sixteenth Embodiment

Figure 22:
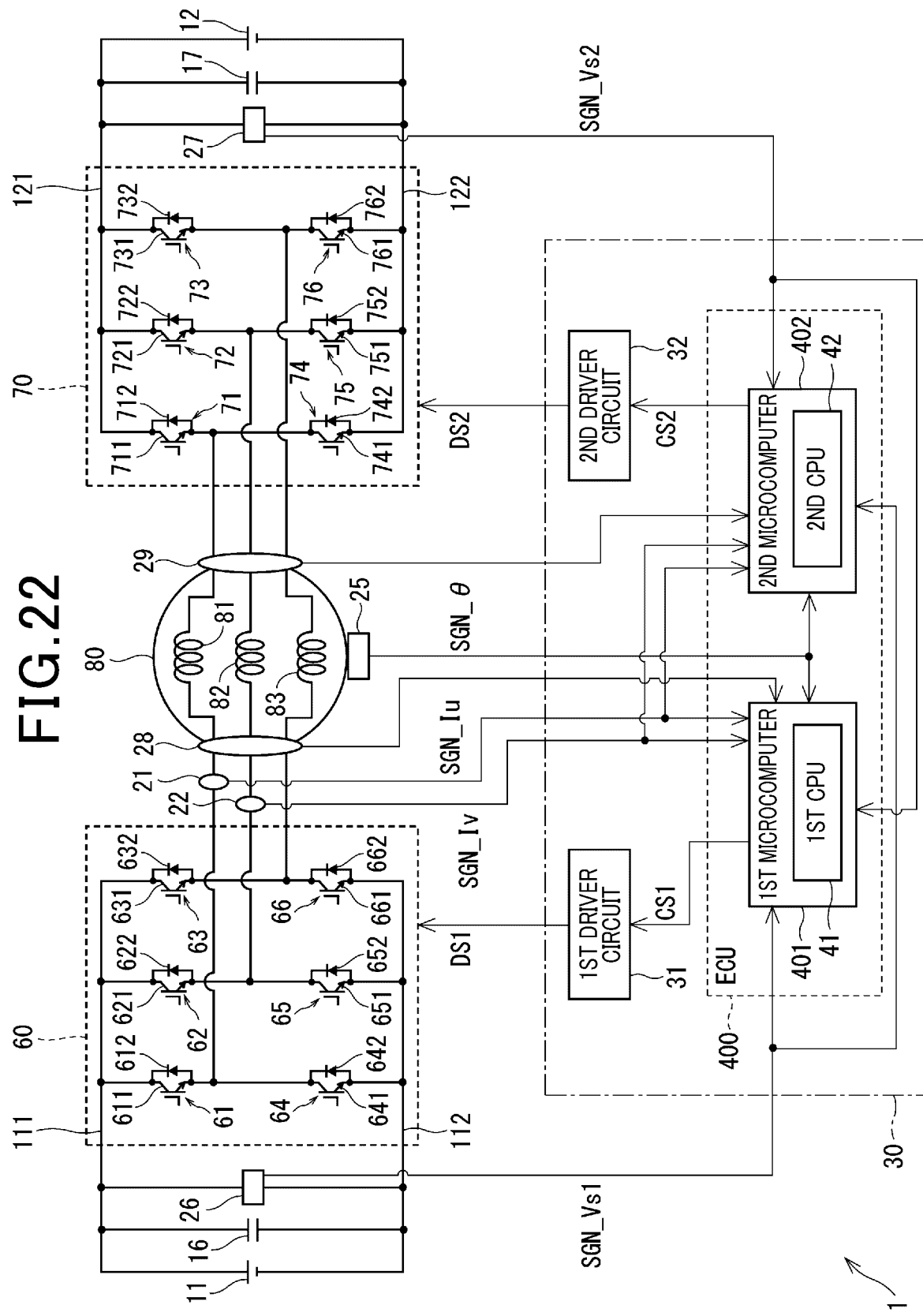
FIG. 22 is a schematic diagram illustrating the configuration of a control apparatus according to a sixteenth embodiment.

In the sixteenth embodiment, as shown in FIG. 22, on the first inverter 60 side of the U-phase, V-phase and W-phase coils 81-83, there is provided a first voltage sensor 28 to detect a first coil-voltage which is at least one of the U-phase voltage Vu1, the V-phase voltage Vv1 and the W-phase voltage Vw1 on the first inverter 60 side. The detection result of the first voltage sensor 28 is outputted to the first microcomputer 401. Moreover, on the second inverter 70 side of the U-phase, V-phase and W-phase coils 81-83, there is provided a second voltage sensor 29 to detect a second coil-voltage which is at least one of the U-phase voltage Vu2, the V-phase voltage Vv2 and the W-phase voltage Vw2 on the second inverter 70 side. The detection result of the second voltage sensor 29 is outputted to the second microcomputer 402.

Figure 23:
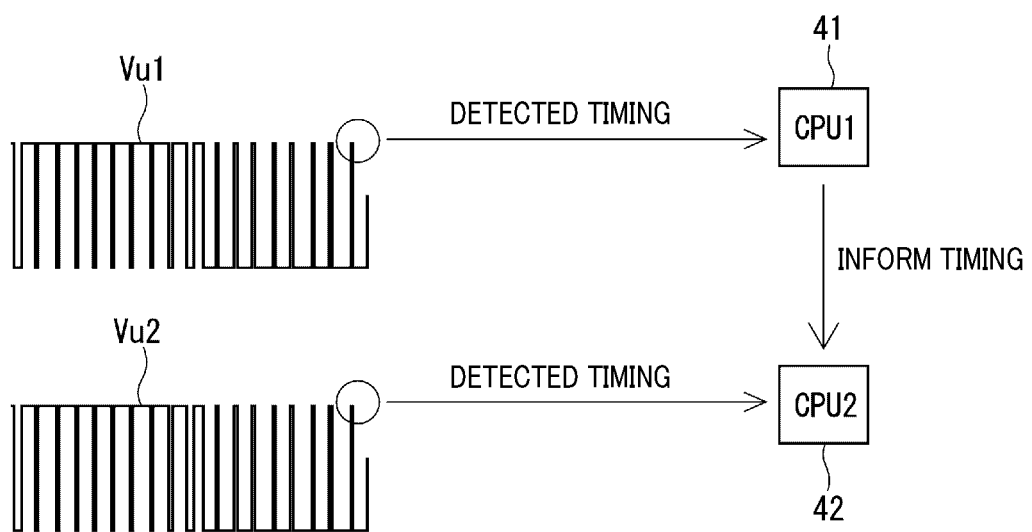
FIG. 23 is a schematic diagram illustrating a synchronization process based on comparison between edge timings of two voltages of the same phase detected respectively by first and second CPUs in the control apparatus according to the sixteenth embodiment.

On the left side in FIG. 23, there are shown both the U-phase voltage Vu1 on the first inverter 60 side and the U-phase voltage Vu2 on the second inverter 70 side. In the case of the same voltage command being issued to both the first and second inverters 60 and 70, the rising and falling timings of the U-phase voltage Vu1 are coincident with those of the U-phase voltage Vu2.

In view of the above, in the present embodiment, the first CPU 41 detects an edge timing of the U-phase voltage Vu1 based on the detection result of the first voltage sensor 28 and informs the second CPU 42 of the detected edge timing. The second CPU 42 detects an edge timing of the U-phase voltage Vu2 based on the detection result of the second voltage sensor 29. Moreover, the second CPU42 compares the edge timing of the U-phase voltage Vu1 with the edge timing of the U-phase voltage Vu2, thereby correcting deviations from the clocks to the control timings.

In addition, the correction may be performed based on, instead of the edge timings, timings at which the U-phase voltages Vu1 and Vu2 reach any predetermined value. The synchronization process may be performed based on a pair of V-phase voltages Vv1 and Vv2 or a pair of W-phase voltages Vw1 and Vw2 instead of the pair of U-phase voltages Vu1 and Vu2. Furthermore, the synchronization process may also be performed based on at least two of the pair of the U-phase voltages Vu1 and Vu2, the pair of V-phase voltages Vv1 and Vv2 and the pair of W-phase voltages Vw1 and Vw2.

In the present embodiment, the synchronization information is the coil-voltages applied to the coils 81-83. The second CPU 42 performs the synchronization process based on pulse edge timings of the coil-voltages. Consequently, it becomes possible to suitably synchronize switching timings between the first and second inverters 60 and 70. In addition, it is also possible to achieve the same advantageous effects as in the previous embodiments.

Seventeenth Embodiment

Figure 24:
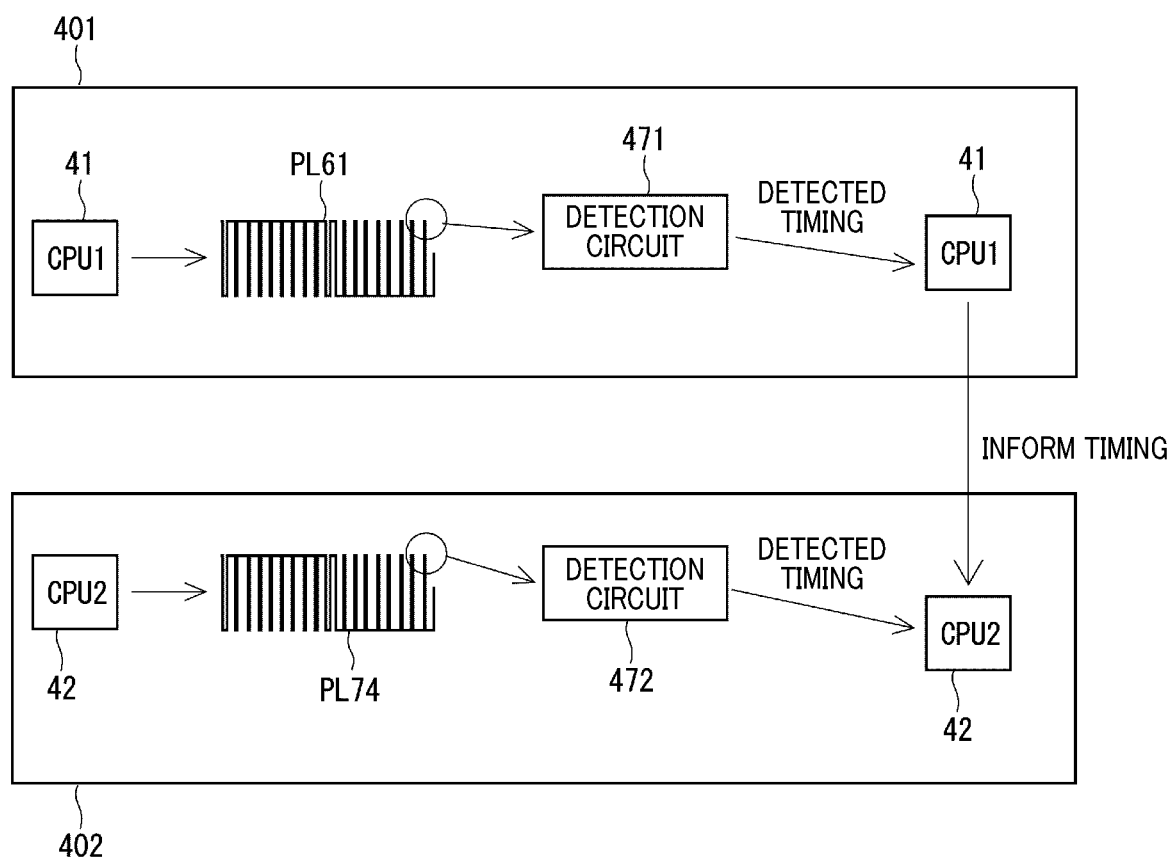
FIG. 24 is a schematic diagram illustrating a synchronization process based on comparison between edge timings of two pulse signals detected respectively by first and second CPUs in a control apparatus according to a seventeenth embodiment.

In the seventeenth embodiment, as shown in FIG. 24, the first microcomputer 401 includes a first detection circuit 471 that internally acquires the first control signal CS1 outputted from the first CPU 41. Similarly, the second microcomputer 402 includes a second detection circuit 472 that internally acquires the second control signal CS2 outputted from the second CPU 42. Each of the first and second detection circuits 471 and 472 may be a hardware circuit or a software circuit. In addition, it should be noted that for the sake of convenience of explanation, each of the first and second CPUs 41 and 42 is shown in two parts in FIG. 24.

As described in the first embodiment, during the execution of the inverse SW control, the switching element 61 of the first inverter 60 and the switching element 74 of the second inverter 70 are turned on and off at the same time. The first detection circuit 471 detects a pulse signal PL61 for the on/off operation of the switching element 61 of the first inverter 60 and outputs the detection result to the first CPU 41. Similarly, the second detection circuit 472 detects a pulse signal PL74 for the on/off operation of the switching element 74 of the second inverter 70 and outputs the detection result to the second CPU 42.

The first CPU 41 detects, based on the detection result of the first detection circuit 471, an edge timing of the pulse signal PL61 for the switching element 61 of the first inverter 60 and outputs the detected edge timing to the second CPU 42. The second CPU 42 detects, based on the detection result of the second detection circuit 472, an edge timing of the pulse signal PL74 for the switching element 74 of the second inverter 70. Moreover, the second CPU42 compares the edge timing of the pulse signal PL61 for the switching element 61 with the edge timing of the pulse signal PL74 for the switching element 74, thereby correcting deviations from the clocks to the control timings. Consequently, it becomes possible to suitably synchronize switching timings between the first and second inverters 60 and 70. Moreover, it is also possible to achieve the same advantageous effects as in the previous embodiments.

In addition, in the above explanation, the synchronization process is performed based on the pulse signals PL61 and PL74 for the pair of the switching elements 61 and 74 that are turned on and off at the same time in the inverse SW control. Alternatively, the synchronization process may be performed based on pulse signals for other pairs of the switching elements that are turned on and off at the same time in the inverse SW control, such as pulse signals for the pair of the switching elements 62 and 75.

Eighteenth Embodiment

In the eighteenth embodiment, the control apparatus 1 includes the first and second voltage sensors 28 and 29 as in the sixteenth embodiment.

Figure 25:
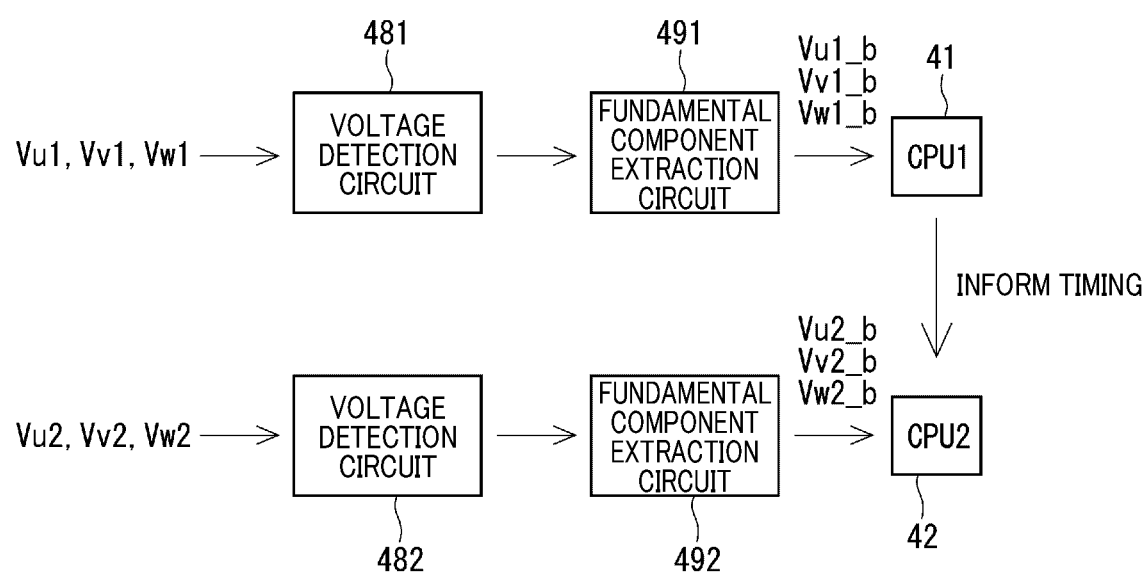
FIG. 25 is a schematic diagram illustrating a synchronization process based on comparison between timings at which fundamental components of two voltages of the same phase respectively reach a predetermined value and which are detected respectively by first and second CPUs in a control apparatus according to an eighteenth embodiment.

Moreover, in the eighteenth embodiment, as shown in FIG. 25, a voltage detection circuit 481 and a fundamental component extraction circuit 491 are provided in the first microcomputer 401 (not shown in FIG. 25). The voltage detection circuit 481 detects, based on the detection result of the first voltage sensor 28, the U-phase voltage Vu1, the V-phase voltage Vv1 and the W-phase voltage Vw1 on the first inverter 60 side. The fundamental component extraction circuit 491 extracts, by a filter process or the like, fundamental components $Vu1\_b$, $Vv1\_b$ and $Vw1\_b$ respectively from the phase voltages Vu1, Vv1 and Vw1.

Similarly, a voltage detection circuit 482 and a fundamental component extraction circuit 492 are provided in the second microcomputer 402 (not shown in FIG. 25). The voltage detection circuit 482 detects, based on the detection result of the second voltage sensor 29, the U-phase voltage Vu2, the V-phase voltage Vv2 and the W-phase voltage Vw2 on the second inverter 70 side. The fundamental component extraction circuit 492 extracts, by a filter process or the like, fundamental components $Vu2\_b$, $Vv2\_b$ and $Vw2\_b$ respectively from the phase voltages Vu2, Vv2 and Vw2.

In the case of the same voltage command being issued to both the first and second inverters 60 and 70, the fundamental components $Vu1\_b$, $Vv1\_b$ and $Vw1\_b$ of the phase voltages Vu1, Vv1 and Vw1 on the first inverter 60 side are respectively identical to the fundamental components $Vu2\_b$, $Vv2\_b$ and $Vw2\_b$ of the phase voltages Vu2, Vv2 and Vw2 on the second inverter 70 side.

Figure 26:
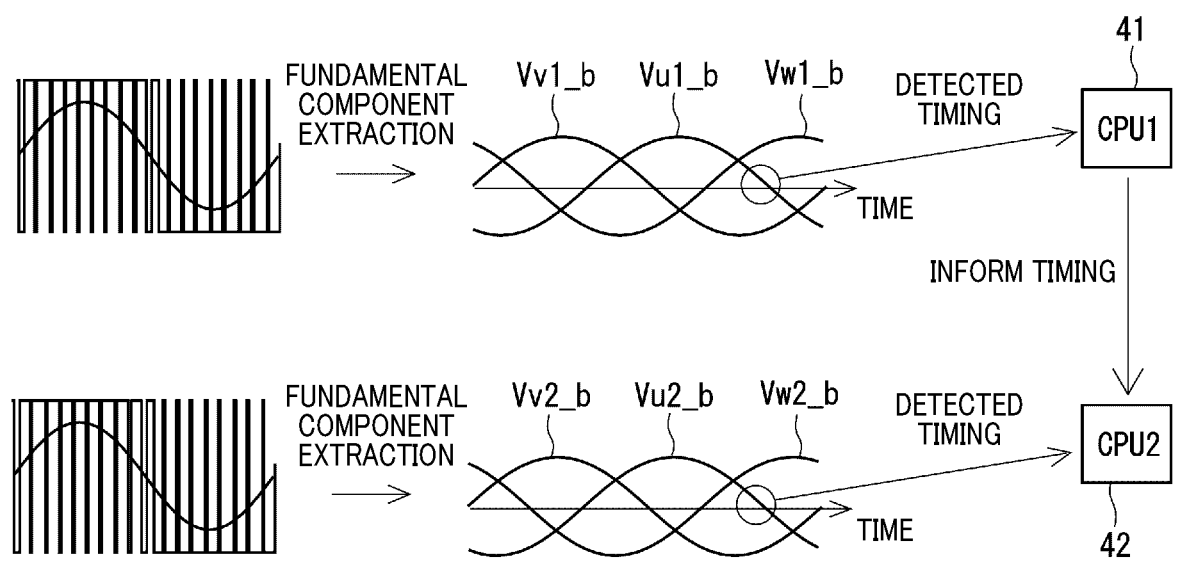
FIG. 26 is another schematic diagram illustrating the synchronization process according to the eighteenth embodiment.

In view of the above, in the present embodiment, as shown in FIG. 26, the first CPU 41 detects a zero-cross timing of the U-phase fundamental component $Vu1\_b$ and informs the second CPU 42 of the detected zero-cross timing. The second CPU 42 detects a zero-cross timing of the U-phase fundamental component $Vu2\_b$. Moreover, the second CPU 42 compares the zero-cross timing of the U-phase fundamental component $Vu1\_b$ with the zero-cross timing of the U-phase fundamental component Vu2_b, thereby correcting deviation of control timings.

The synchronization process may alternatively be performed by comparing, instead of the zero-cross timings, other timings at which the fundamental components Vu1_b and Vu2_b have a value in the range from 0 to an upper or lower peak value. Moreover, the synchronization process may alternatively be performed based on the V-phase fundamental components Vv1_b and Vv2_b or the W-phase fundamental components Vw1_b and Vw2_b instead of the U-phase fundamental components Vu1_b and Vu2_b. Furthermore, the synchronization process may alternatively be performed based on the fundamental components of the voltages of two or three phases. The above is the same in the nineteenth embodiment to be described later. In addition, it should be noted that for the sake of simplicity, the pulse signals and fundamental components of the voltages of only one phase before the fundamental component extraction are shown in FIG. 26.

As described above, in the present embodiment, the control apparatus 1 includes the fundamental component extraction circuits 491 and 492 that are configured to extract the fundamental components of the coil-voltages applied to the coils 81-83. The synchronization information is the fundamental components of the coil-voltages. Taking the U-phase voltages Vu1 and Vu2 as an example, upon the fundamental components Vu1_b and Vu2_b of the U-phase voltages Vu1 and Vu2 reaching a predetermined value, the second CPU 42 performs the synchronization process based on both the timing at which the fundamental component Vu1_b reaching the predetermined value is recognized by the first CPU 41 and the timing at which the fundamental component Vu2_b reaching the predetermined value is recognized by the second CPU 42. Consequently, it becomes possible to suitably synchronize switching timings between the first and second inverters 60 and 70. In addition, it is also possible to achieve the same advantageous effects as in the previous embodiments.

Nineteenth Embodiment

As described above, in the eighteenth embodiment, the synchronization process is performed based on the fundamental components of the actual voltages detected by the voltage sensors 28 and 29. In contrast, in the nineteenth embodiment, the synchronization process is performed based on command voltages.

Figure 27:
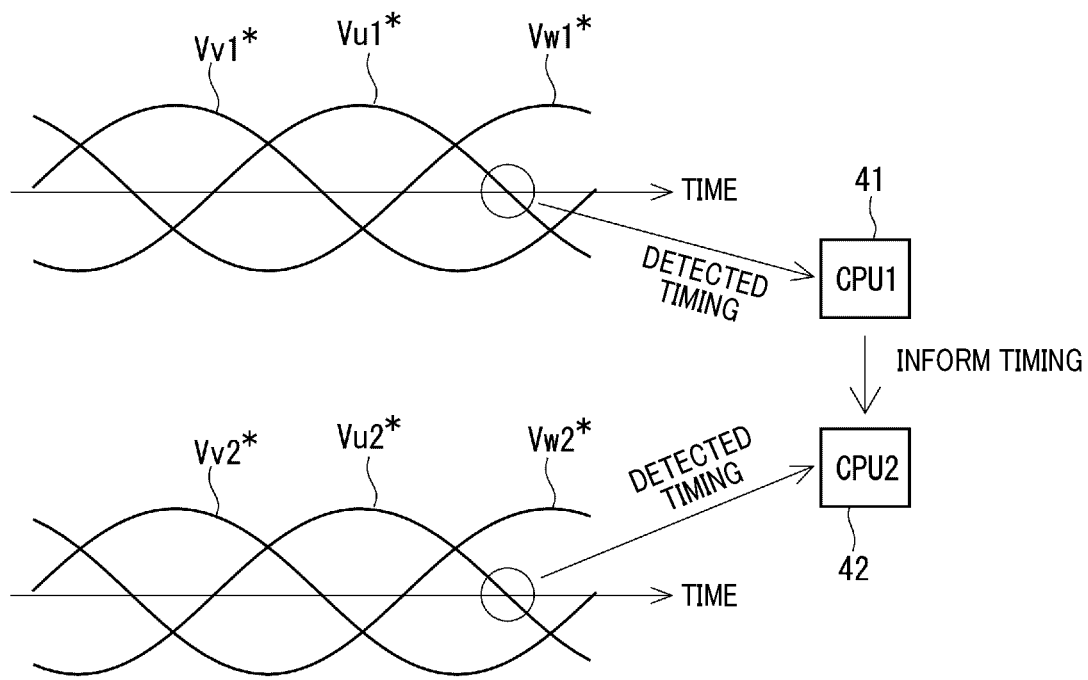
FIG. 27 is a schematic diagram illustrating a synchronization process based on comparison between timings at which first and second command voltages respectively reach a predetermined value and which are detected respectively by first and second CPUs in a control apparatus according to a nineteenth embodiment.

Specifically, in the present embodiment, as shown in FIG. 27, the first CPU 41 internally acquires first command voltages Vu1*, Vv1* and Vw1*, detects a zero-cross timing of the first U-phase command voltage Vu1*, and informs the second CPU 42 of the detected zero-cross timing. The second CPU 42 internally acquires second command voltages Vu2*, Vv2* and Vw2* and detects a zero-cross timing of the second U-phase command voltage Vu2*. Moreover, the second CPU42 compares the zero-cross timing of the first U-phase command voltage Vu1* with the zero-cross timing of the second U-phase command voltage Vu2*, thereby correcting deviation of switching timings.

As described above, in the present embodiment, the synchronization information is the first command voltages Vu1*, Vv1* and Vw1* used for generation of the first control signal CS1 in the first CPU 41 and the second command voltages Vu2*, Vv2* and Vw2* used for generation of the second control signal CS2 in the second CPU 42. In the case of performing control to apply the same phase-voltages to both the first inverter 60 side and the second inverter 70 side, upon the first and second command voltages of one of the U, V and W phases reaching a predetermined value, the second CPU 42 performs the synchronization process based on both the timing at which the first command voltage reaching the predetermined value is recognized by the first CPU 41 and the timing at which the second command voltage reaching the predetermined value is recognized by the second CPU 42. Consequently, it becomes possible to suitably synchronize switching timings between the first and second inverters 60 and 70. In addition, it is also possible to achieve the same advantageous effects as in the previous embodiments.

Twentieth Embodiment

Figure 28:
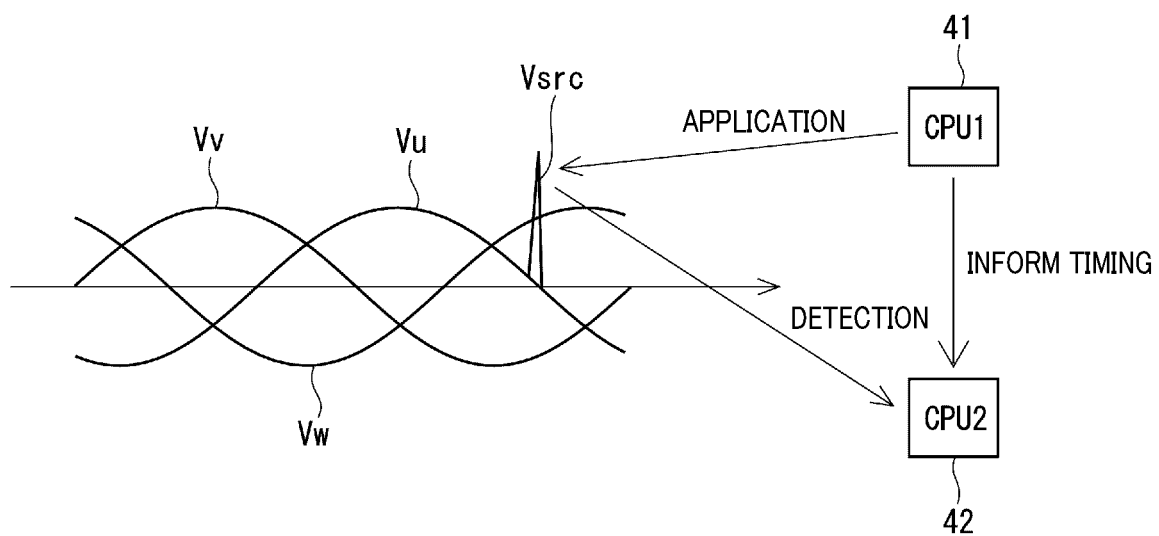
FIG. 28 is a schematic diagram illustrating a synchronization process based on comparison between an application timing at which a search voltage is applied by a first CPU and a detection timing at which the search voltage is detected by a second CPU in a control apparatus according to a twentieth embodiment.

In the twentieth embodiment, as shown in FIG. 28, a search voltage Vsrc is applied to one of the U-phase, V-phase and W-phase coils 81-83 by a command from one of the CPUs 41 and 42 and the search voltage Vsrc is detected by the other of the CPUs 41 and 42. More particularly, in the example shown in FIG. 28, a search voltage Vsrc is applied to the U-phase coil 81 by a command from the first CPU 41. Moreover, the first CPU 41 informs the second CPU 42 of the application timing of the search voltage Vsrc. The second CPU 42 detects the search voltage Vsrc. Moreover, the second CPU 42 compares the application timing of the search voltage Vsrc with the detection timing of the search voltage Vsrc, thereby correcting deviation between the timings. The search voltage Vsrc may be detected based on the detection results of the voltage sensors 28 and 29, or by detecting a value relating to a voltage command value in the second CPU 42. In addition, in the second CPU 42, the search voltage Vsrc is automatically generated by feedback control; therefore, it is possible to perform the synchronization process based on the command.

In the example shown in FIG. 28, a surge voltage is applied as the search voltage Vsrc to the U-phase coil 81. However, other voltages, such as a zero-phase voltage, a harmonic voltage or a pulse voltage, may alternatively be applied as the search voltage Vsrc. Moreover, the search voltage Vsrc may be applied to the V-phase coil 82 or the W-phase coil 83 instead of the U-phase coil 81. Furthermore, the search voltage Vsrc may be applied to at least two of the U-phase, V-phase and W-phase coils 81-83.

As described above, in the present embodiment, the synchronization information is information on the occurrence timing of the search voltage Vsrc. The first CPU 41 applies the search voltage Vsrc and informs the second ECU 42 of the application timing of the search voltage Vsrc. The second CPU 42 detects the search voltage Vsrc and performs the synchronization process based on both the application timing and the detection timing of the search voltage Vsrc. Consequently, it becomes possible to suitably synchronize switching timings between the first and second inverters 60 and 70. In addition, it is also possible to achieve the same advantageous effects as in the previous embodiments.

Twenty-First Embodiment

Figure 29:
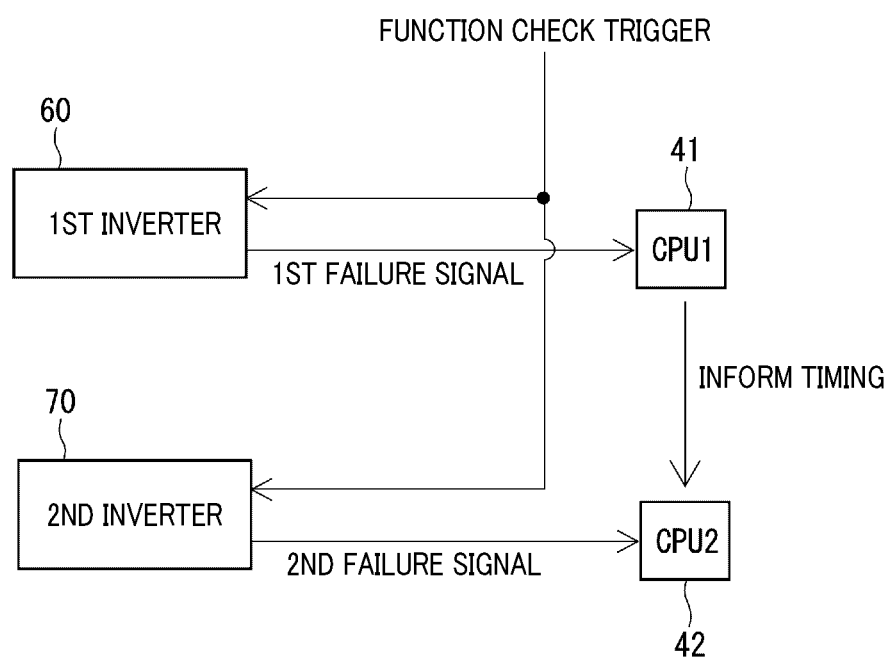
FIG. 29 is a schematic diagram illustrating a synchronization process based on comparison between timings at which first and second inverters are caused by a function check trigger to respectively output first and second failure signals and which are detected respectively by first and second CPUs in a control apparatus according to a twenty-first embodiment.

In the twenty-first embodiment, as shown in FIG. 29, the first inverter 60 is configured to output a first failure signal to the first CPU 41 when a failure, such as overcurrent, overvoltage or overheating, has occurred in the first inverter 60 or the first inverter 60 has been brought into in a pseudo-failure state by a function check trigger. Similarly, the second inverter 70 is configured to output a second failure signal to the second CPU 42 when a failure, such as overcurrent, overvoltage or overheating, has occurred in the second inverter 70 or the second inverter 70 has been brought into in a pseudo-failure state by a function check trigger. That is, upon the output of a function check trigger to the inverters 60 and 70, the inverters 60 and 70 are regarded as being in a pseudo-failure state though no failure has actually occurred therein, and the first and second failure signals are outputted respectively from the inverters 60 and 70.

In the present embodiment, the synchronization information is the failure signals; as the synchronization process, deviation of control timings is corrected. The failure signals used in the synchronization process may be those which are outputted by actually causing a failure to occur for an extremely short time or those which are outputted by the inverters 60 and 70 in a pseudo-failure state in response to a function check trigger included in an activation sequence or the like.

In the present embodiment, as shown in FIG. 29, in response to a common function check signal outputted to the first and second inverters 60 and 70, the first and second failure signals are respectively outputted from the first and second inverters 60 and 70 to the first and second CPUs 41 and 42. The first CPU 41 informs the second ECU 42 of the timing at which the first failure signal is outputted from the first inverter 60. The second CPU 42 compares the timing at which the first failure signal is outputted from the first inverter 60 with the timing at which the second failure signal is outputted from the second inverter 70, thereby correcting deviation between the timings.

Each of the first and second failure signals may be, for example, an overcurrent signal, an overvoltage signal or an overheating signal. Moreover, each of the first and second failure signals may be outputted only once, or by a plurality of times for more reliable performing the synchronization process. The function check trigger may be generated by one of the first and second CPUs 41 and 42 in a software manner, or by a dedicated trigger generation circuit in a hardware manner.

As described above, in the present embodiment, the first inverter 60 is configured to output, when it is brought into a failure state or a pseudo-failure state, the first failure signal to the first CPU 41. The second inverter 70 is configured to output, when it is brought into a failure state or a pseudo-failure state, the second failure signal to the second CPU 42. The synchronization information is the first and second failure signals. Upon the first and second inverters 60 and 70 being simultaneously brought into a failure state or a pseudo-failure state to respectively output the first and second failure signals, the second CPU 42 performs the synchronization process based on both the timing at which the first failure signal is recognized by the first CPU 41 and the timing at which the second failure signal is recognized by the second CPU 42. Consequently, it becomes possible to suitably synchronize switching timings between the first and second inverters 60 and 70. In addition, it is also possible to achieve the same advantageous effects as in the previous embodiments.

Twenty-Second Embodiment

Figure 30:
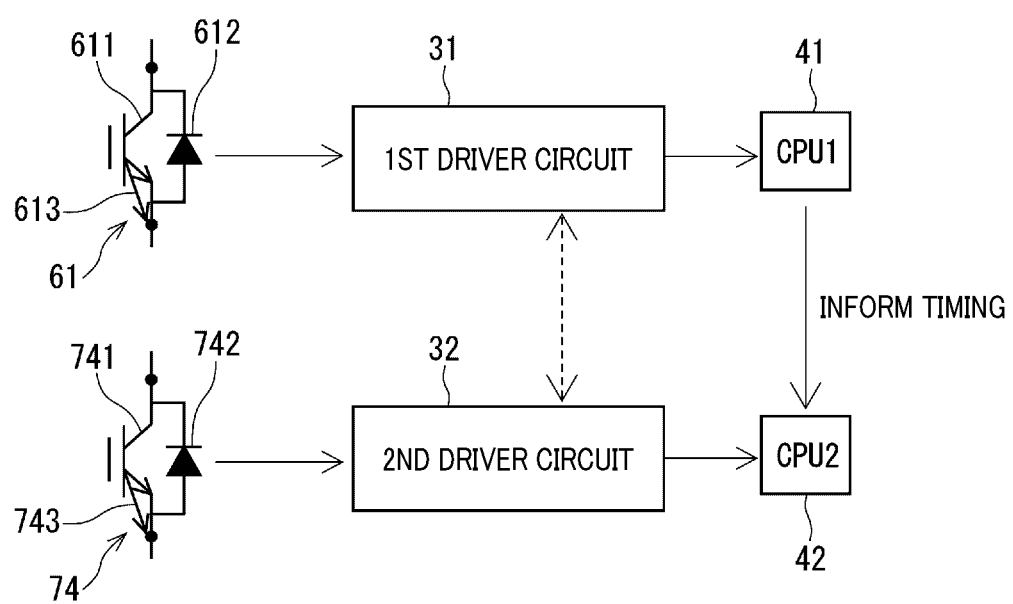
FIG. 30 is a schematic diagram illustrating a synchronization process based on comparison between timings at which currents flowing respectively in two switching elements of first and second inverters respectively reach a predetermined value and which are detected respectively by first and second CPUs in a control apparatus according to a twenty-second embodiment.

In the twenty-second embodiment, as shown in FIG. 30, the switching element 61 of the first inverter 60 has an in-element current detecting unit 613 to detect electric current flowing through the switching element 61. Similarly, the switching element 74 of the second inverter 70 has an in-element current detecting unit 743 to detect electric current flowing through the switching element 74. In addition, though not shown in the figures, the switching elements 62-66 of the first inverter 60 and the switching elements 71-73, 75 and 76 of the second inverter 70 also each have an in-element current detecting unit to detect electric current flowing therethrough.

As described in the first embodiment, during the execution of the inverse SW control, the same electric current (i.e., the U-phase current) flows through both the switching element 61 of the first inverter 60 and the switching element 74 of the second inverter 70.

In view of the above, in the present embodiment, the detection results of the in-element current detecting units 613 and 743 of the switching elements 61 and 74 are respectively outputted to the first and second CPUs 41 and 42 via the first and second driver circuits 31 and 32. The first CPU 41 detects the timing at which the electric current flowing through the switching element 61 of the first inverter 60 reaches a predetermined value (e.g., 0, an upper peak value or a lower peak value) and informs the second CPU 42 of the detected timing. The second CPU 42 detects the timing at which the electric current flowing through the switching element 74 of the second inverter 70 reaches the predetermined value. Moreover, the second CPU 42 compares the timing at which the electric current flowing through the switching element 61 reaches the predetermined value with the timing at which the electric current flowing through the switching element 74 reaches the predetermined value, thereby correcting deviation between the timings.

As described above, in the present embodiment, each of the switching elements 61-66 and 71-76 of the first and second inverters 60 and 70 has the in-element current detecting unit to detect electric current flowing therethrough. The detection results of the in-element current detecting units of the switching elements 61-66 of the first inverter 60 are outputted to the first CPU 41. The detection results of the in-element current detecting units of the switching elements 71-76 of the second inverter 70 are outputted to the second CPU 42. The synchronization information is information on the electric current flowing through a switching element pair consisting of one of the switching elements 61-66 of the first inverter 60 and one of the switching elements 71-76 of the second inverter 70 (e.g., the switching element 61 of the first inverter 60 and the switching element 74 of the second inverter 70). The switching elements of the switching element pair have the same electric current flowing therethrough. Upon the electric current flowing through the switching element pair reaching a predetermined value, the second ECU 42 performs the synchronization process based on both the timing at which the electric current reaching the predetermined value is recognized by the first CPU 41 and the timing at which the electric current reaching the predetermined value is recognized by the second CPU 42. Consequently, it becomes possible to suitably synchronize switching timings between the first and second inverters 60 and 70. In addition, it is also possible to achieve the same advantageous effects as in the previous embodiments.

Alternatively, as illustrated with a dashed line in FIG. 30, instead of being outputted to the CPUs 41 and 42, the detection results of the in-element current detecting units 613 and 743 of the switching elements 61 and 74 may be outputted from one of the first and second driver circuits 31 and 32 to the other of the first and second driver circuits 31 and 32 or be exchanged between the first and second driver circuits 31 and 32. Moreover, the first and second driver circuits 31 and 32 may compare the timing at which the electric current flowing through the switching element 61 reaches the predetermined value with the timing at which the electric current flowing through the switching element 74 reaches the predetermined value, thereby synchronizing the output timings between the first drive signals DS1 and the second drive signals DS2.

That is, in the above modification, the detection results of the in-element current detecting units of the switching elements 61-66 of the first inverter 60 are outputted to the first driver circuit 31 that outputs the first drive signals DS1 for drive of the switching elements 61-66. The detection results of the in-element current detecting units of the switching elements 71-76 of the second inverter 70 are outputted to the second driver circuit 32 that outputs the second drive signals DS2 for drive of the switching elements 71-76. Based on both the timing at which the electric current flowing through the switching element 61 reaches the predetermined value and the timing at which the electric current flowing through the switching element 74 reaches the predetermined value, the first and second driver circuits 31 and 32 synchronize the output timings between the first drive signals DS1 and the second drive signals DS2. Consequently, it becomes possible to suitably synchronize switching timings between the first and second inverters 60 and 70. In addition, it is also possible to achieve the same advantageous effects as in the previous embodiments.

While the above particular embodiments and modifications have been shown and described, it will be understood by those skilled in the art that various further modifications, changes, and improvements may be made without departing from the spirit of the present disclosure.

For example, in the above-described embodiments, the control apparatus 1 includes two operation circuits (i.e., the first and second CPUs 41 and 42). Alternatively, the control apparatus 1 may include three or more operation circuits.

Figure 31:
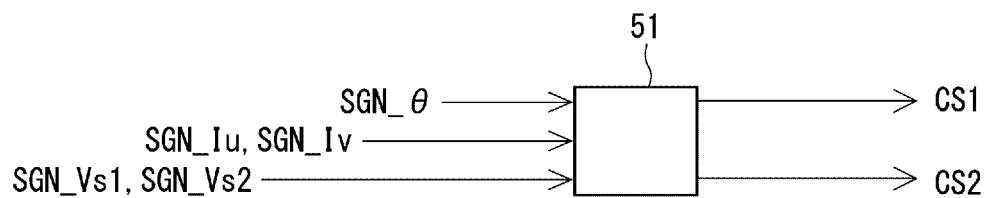
FIG. 31 is a schematic diagram illustrating the configuration of a CPU according to a modification.

Moreover, as shown in FIG. 31, the control apparatus 1 may alternatively include only a single CPU 51 that generates both the first and second control signals CS1 and CS2. In this case, the single CPU 51, which is an operation circuit (or arithmetic and logic unit), can be regarded as including both a "first operation circuit" configured to generate the first control signal CS1 and a "second operation circuit" configured to generate the second control signal CS2, similar to the main ECU 51 described in the tenth embodiment.

The synchronization processes described in the above embodiments may be combined in any suitable manners. For example, it is possible to: first synchronize the electrical angle θ_cpu1 in the first CPU 41 with the electrical angle θ_cpu2 in the second CPU 42 as described in the first to the fourth embodiments; and then synchronize the carrier signal CRR_cpu1 generated in the first CPU 41 with the carrier signal CRR_cpu2 generated in the second CPU 42 as described in the sixth embodiment. As an alternative, it is also possible to: first synchronize the electrical angle θ_cpu1 in the first CPU 41 with the electrical angle θ_cpu2 in the second CPU 42 as described in the first to the fourth embodiments; and then synchronize the clock signal CLK_cpu1 generated in the first CPU 41 with the clock signal CLK_cpu2 generated in the second CPU 42 as described in the fifth embodiment. In either of the above modifications, it is possible to further improve the synchronization accuracy.

In the above-described embodiments, the two voltage sources are respectively implemented by the first and second batteries 11 and 12 each of which is a secondary battery. Alternatively, it is possible to implement only one of the two voltage sources with a secondary battery while implementing the other of the two voltage sources with, for example, a fuel cell or an electric generator driven by an internal combustion engine.

In the above-described embodiments, the rotating electric machine (i.e., MG 80) includes the coils 81-83 of three phases. Alternatively, the rotating electric machine may include coils of two phases or coils of four or more phases.

In the above-described embodiments, the number of the switching elements included in each of the first and second inverters 60 and 70 is set to 3 (phases)×2=6. However, the number of the switching elements included in each of the first and second inverters 60 and 70 may alternatively be set to any other suitable number according to the circuit configuration of the inverters and the number of phases of the coils.

In the above-described embodiments, the control apparatus 1 is provided to control the MG 80. However, the control apparatus 1 may alternatively be used for controlling other rotating electric machines, such as an electric motor. Moreover, the electric motor is not limited to a permanent magnet synchronous motor, but may be, for example, an induction motor or a field coil synchronous motor.

In the above-described embodiments, the control apparatus 1 is provided to control the MG 80 which functions as the main motor of the vehicle. However, the control apparatus 1 may alternatively be used to control rotating electric machines of other applications.

What is claimed is:

1. A control apparatus for controlling drive of a rotating electric machine, the rotating electric machine having coils of two or more phases, the control apparatus comprising:
a first inverter to be connected with first ends of the coils, the first inverter having a plurality of first switching elements each corresponding to one of the coils;
a second inverter to be connected with second ends of the coils, the second inverter having a plurality of second switching elements each corresponding to one of the coils; and
a controller including a first operation circuit and a second operation circuit, the first operation circuit being configured to generate a first control signal for control of the first inverter, the second operation circuit being configured to generate a second control signal for control of the second inverter, wherein:
the control apparatus is configured so that switching timings are synchronized, based on synchronization information, between the first and second inverters;
the synchronization information consists of rotation angle information, which is based on a detection result of a rotation angle sensor that is configured to detect a rotational position of the rotating electric machine, so that the switching timings between the first and second inverters are synchronized based only on the rotation angle information; and
the same rotation angle information is branched and inputted to both the first and second operation circuits.

2. The control apparatus as set forth in claim 1, wherein the controller comprises a first controller that includes the first operation circuit, and a second controller that includes the second operation circuit and is provided separately from the first controller.

3. The control apparatus as set forth in claim 1, wherein the controller is a single controller, and
both the first and second operation circuits are provided in the single controller.

4. The control apparatus as set forth in claim 1, further comprising a synchronization adjusting circuit that is configured to synchronize, based on the synchronization information, the first control signal outputted from the first operation circuit with the second control signal outputted from the second operation circuit.

5. The control apparatus as set forth in claim 1, wherein both the first operation circuit and the second operation circuit are included in a single operation circuit,
- the first control signal for control of the first inverter comprises a first upper-arm control signal for control of an upper arm of the first inverter and a first lower-arm control signal for control of a lower arm of the first inverter,
- the second control signal for control of the second inverter comprises a second upper-arm control signal for control of an upper arm of the second inverter and a second lower-arm control signal for control of a lower arm of the second inverter,
- the single operation circuit generates one of a first signal pair consisting of the first upper-arm control signal and the second lower-arm control signal and a second signal pair consisting of the first lower-arm control signal and the second upper-arm control signal, and
- the other of the first and second signal pairs is generated by a process of inverting the one of the first and second signal pairs which is generated by the single operation circuit.

6. The control apparatus as set forth in claim 1, wherein the first inverter is connected with a first voltage source, and
- the second inverter is connected with a second voltage source that is insulated from the first voltage source.

7. The control apparatus as set forth in claim 1, wherein the rotation angle sensor is configured to output analog signals indicative of the detected rotational position of the rotating electric machine,
- the control apparatus further comprises an analog-to-digital converter configured to convert the analog signals outputted from the rotation angle sensor into digital signals, and
- the digital signals are branched and inputted, as the rotation angle information, to both the first and second operation circuits.

\* \* \* \* \*